US010640975B2

(12) United States Patent
Place et al.

(10) Patent No.: US 10,640,975 B2
(45) Date of Patent: May 5, 2020

(54) CEILING SYSTEM

(71) Applicant: ARMSTRONG WORLD INDUSTRIES, INC., Lancaster, PA (US)

(72) Inventors: Kain A. Place, Lancaster, PA (US); Scott D. Harnish, Lancaster, PA (US); Jeffrey T. Markley, Middle River, MD (US); Ian V. White, Philadelphia, PA (US); Ian McDermott, Lincoln University, PA (US); James F. Hooper, Jr., Wenonah, NJ (US); Todd M. Bergman, Lititz, PA (US); David E. Rice, Lititz, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 16/137,366

(22) Filed: Sep. 20, 2018

(65) Prior Publication Data
US 2019/0085559 A1 Mar. 21, 2019

Related U.S. Application Data

(60) Provisional application No. 62/561,407, filed on Sep. 21, 2017.

(51) Int. Cl.
*E04B 9/20* (2006.01)
*E04B 9/18* (2006.01)
(Continued)

(52) U.S. Cl.
CPC ............... *E04B 9/205* (2013.01); *E04B 9/18* (2013.01); *F16B 7/0493* (2013.01); *E04B 9/067* (2013.01); *E04B 9/068* (2013.01); *F16B 2/241* (2013.01)

(58) Field of Classification Search
USPC ......... 52/29, 506.05, 506.07, 506.08; 4/693; 248/200.1, 201, 330.1
See application file for complete search history.

(56) References Cited

U.S. PATENT DOCUMENTS 1,606,289 A * 11/1926 Bowers ................. E04B 9/20
248/327
2,138,441 A * 11/1938 Bombard ............... A47H 23/01
160/290.1
(Continued)

FOREIGN PATENT DOCUMENTS

BE 845695 A * 12/1976
DE 2728912 A * 1/1979
(Continued)

OTHER PUBLICATIONS

International Search Report for Related Application No. PCT/US2018/052058, dated Jan. 31, 2019.

*Primary Examiner* — Robert Canfield
(74) *Attorney, Agent, or Firm* — Craig M. Sterner

(57) ABSTRACT

Described herein is a ceiling system in one embodiment includes a grid support member, ceiling panel, and grid hanger configured to support the grid support member in a suspended manner from an overhead structural support. The grid hanger includes a mounting bracket configured for attachment to the structural support and a hanger member. The hanger member is adjustable in a plurality of selectable mounting positions relative to the mounting bracket, thereby allowing the mounted height of the grid support member to be adjusted in the field. In some embodiment, the hanger member is further angularly adjustable relative to the mounting bracket to avoid installation obstacles. Locking elements are provided to secure the hanger member in the selected (Continued)

mounting position. In one embodiment, the grid support member may have a T-shaped cross section.

19 Claims, 30 Drawing Sheets

(51) Int. Cl.
*F16B 7/04* (2006.01)
*E04B 9/06* (2006.01)
*F16B 2/24* (2006.01)

(56) References Cited

U.S. PATENT DOCUMENTS

| | | | | |
|---|---|---|---|---|
| 2,496,090 | A * | 1/1950 | Grohs | A01K 97/01 43/17 |
| 2,584,375 | A * | 2/1952 | Widmer | E05C 17/20 292/275 |
| 2,881,494 | A * | 4/1959 | Meyer | A47H 13/06 24/365 |
| 2,968,850 | A * | 1/1961 | Tinnerman | A47B 57/56 248/316.7 |
| 3,035,672 | A * | 5/1962 | Tuten | E04B 9/04 52/506.07 |
| 3,125,764 | A * | 3/1964 | Young | E03C 1/23 4/692 |
| 3,263,243 | A * | 8/1966 | Doyle | A47K 1/14 4/689 |
| 3,562,873 | A * | 2/1971 | Cumber | F16B 2/246 403/397 |
| 3,708,941 | A | 1/1973 | Cuckson | |
| 3,911,638 | A * | 10/1975 | Englund | E04B 9/10 52/506.08 |
| 3,995,823 | A * | 12/1976 | Hensel | E04B 9/18 248/327 |
| 3,998,020 | A * | 12/1976 | Kuhr | E04B 9/18 52/506.07 |
| 3,998,419 | A * | 12/1976 | Semmerling | E04B 9/18 248/323 |
| 4,160,344 | A * | 7/1979 | Brugman | E04B 9/205 248/297.51 |
| 4,266,384 | A * | 5/1981 | Orals | E04B 9/22 52/407.1 |
| 4,545,166 | A * | 10/1985 | Kielmeyer | E04B 9/064 52/506.06 |
| 4,663,911 | A | 5/1987 | Gracia | |
| 5,397,090 | A * | 3/1995 | Carson | E04B 9/20 248/327 |
| 5,482,240 | A * | 1/1996 | Caraher | E04B 9/205 248/297.51 |
| 8,407,829 | B2 * | 4/2013 | Vogel | A47K 1/14 4/689 |
| 10,302,110 | B2 * | 5/2019 | Johnson | F16B 7/0493 |
| 2004/0111995 | A1 * | 6/2004 | Dockery | E04B 9/205 52/506.08 |
| 2007/0294979 | A1 * | 12/2007 | Lin | E04B 1/2612 52/702 |
| 2009/0235603 | A1 * | 9/2009 | Bergman | E04B 9/20 52/506.08 |
| 2011/0005145 | A1 * | 1/2011 | Contasti | E04B 1/2608 52/98 |
| 2014/0215935 | A1 | 8/2014 | Geller | |
| 2017/0044767 | A1 | 2/2017 | Gloftis et al. | |

FOREIGN PATENT DOCUMENTS

| | | | | |
|---|---|---|---|---|
| DE | 202004013318 U | * | 12/2004 | |
| EP | 306463 A | * | 3/1989 | |
| EP | 512614 A1 | * | 11/1992 | ............ E04B 9/205 |
| EP | 512614 A1 | * | 11/1993 | |
| EP | 639681 A2 | * | 2/1995 | |
| EP | 0639681 A2 | | 2/1995 | |
| EP | 1188875 A1 | * | 3/2002 | ............ E04B 9/183 |
| EP | 1459659 A1 | | 9/2004 | |
| EP | 2784235 A1 | * | 10/2014 | |
| FR | 2308817 A1 | * | 11/1976 | ............ E03C 1/23 |
| GB | 716177 A | * | 9/1954 | ............ F15B 11/12 |

* cited by examiner

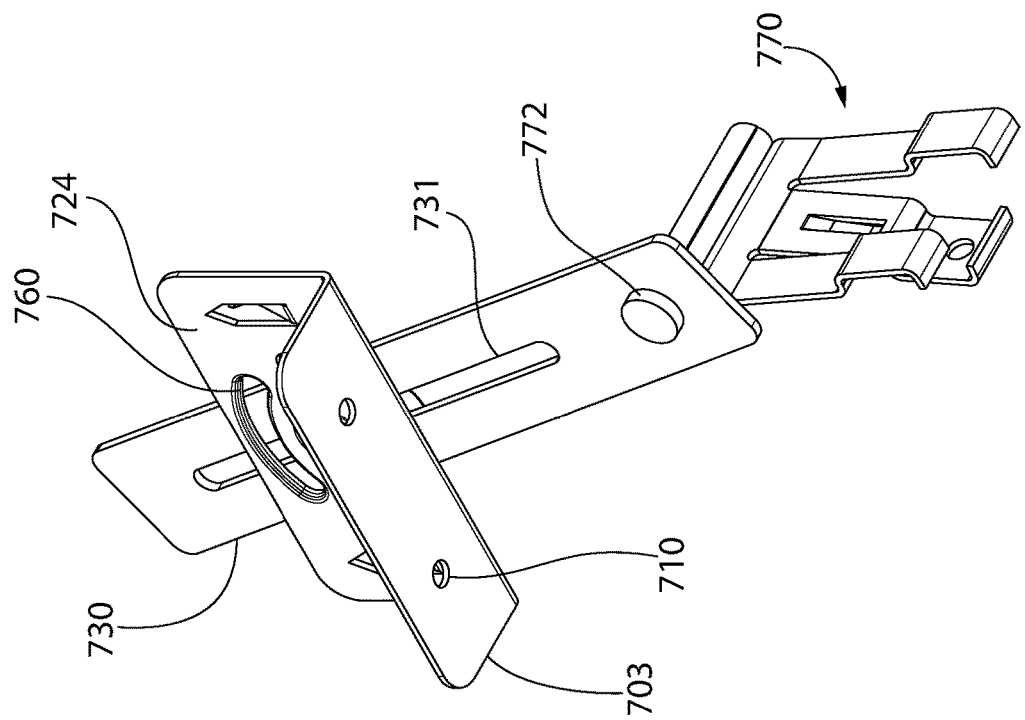
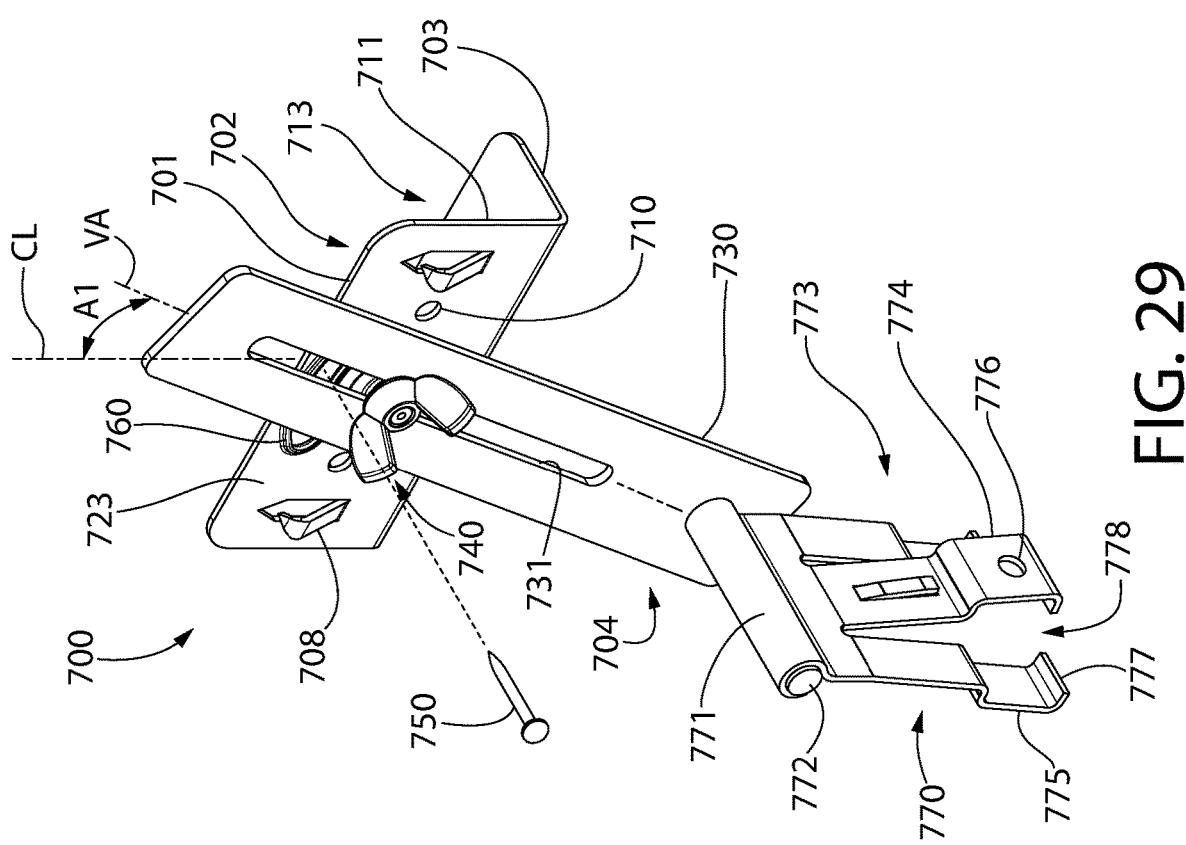
FIG. 30
FIG. 29

CEILING SYSTEM

CROSS-REFERENCE TO RELATED APPLICATIONS

This application claims the benefit of U.S. Provisional Patent Application No. 62/561,407 filed on Sep. 21, 2017. The disclosure of the above application is incorporated herein by reference.

FIELD OF THE INVENTION

The present invention relates to suspended ceiling systems, and more particularly to a system for mounting a ceiling support grid to an overhead support structure.

BACKGROUND OF THE INVENTION

Numerous types of suspended ceiling systems and methods for mounting ceiling panels have been used. One type of system includes a suspended support grid including an array of intersecting grid support members configured to hang a plurality of individual ceiling panels therefrom. An improved ceiling system is desired which can facilitate mounting the support grid to an overhead support structure that provides flexibility to accommodate different site conditions encountered in the field for new and existing installations.

SUMMARY OF THE INVENTION

The present invention provides a suspended ceiling system generally including ceiling panel grid support members and a grid mounting system for securing the grid support members to an overhead support structure. Various embodiments of the present invention provide a field-adjustable grid mounting system that allows quick attachment of the grid support members to the overhead support structure. Once attached, the grid mounting system includes convenient height and angular adjustment features in various embodiments to accommodate a variety of field installation conditions that might be encountered. Advantageously, this translates into less cumbersome ceiling support grid installation and time particularly for non-professional installers.

In one aspect, a grid hanger assembly for mounting a ceiling system comprises: a mounting bracket comprising an elastically deformable spring clip, the mounting bracket defining a vertical mounting centerline; the mounting bracket comprising a bottom flange and adjoining vertical side flange extending upwardly from the bottom flange, the bottom and side flanges configured to engage an overhead support structure when mounted thereto; an elongated hanger member slideably coupled to the spring clip, the hanger member including a coupling end configured to engage a grid support member of the ceiling system, the spring clip configured to frictionally secure the hanger member in one of a plurality of selectable mounting positions relative to the mounting bracket; wherein the spring clip is deformable between an unlocked position allowing adjustment of the hanger member relative to the mounting bracket and a locked position frictionally locking the hanger member in one of the selectable mounting positions.

In another aspect, a ceiling system comprises: an overhead support structure; a grid support member defining a longitudinal axis; a ceiling panel supported by the grid support member; a mounting bracket defining a vertical mounting centerline and comprising a bottom flange and adjoining side flange extending upwardly from the bottom flange, the flanges abuttingly engaging the overhead support structure; the mounting bracket comprising an elastically deformably spring clip; an elongated hanger member slideably coupled to the spring clip, the spring clip configured and operable to frictionally secure the hanger member in a plurality of selectable mounting positions relative to the mounting bracket; wherein the spring clip is deformable between an unlocked position allowing adjustment of the hanger member relative to the mounting bracket and a locked position frictionally locking the hanger member in one of the selectable mounting positions.

In another aspect, a method for mounting a grid hanger assembly of a ceiling system comprises: providing a mounting bracket comprising an elastically deformable spring clip and an elongated hanger member slideably coupled to the spring clip; abutting a bottom flange of the mounting bracket with a bottom surface of an overhead support structure; fixedly attaching a side flange of the mounting bracket to a side surface of the overhead support structure; sliding the hanger member to one of a plurality of selectable mounting positions relative to the mounting bracket, the spring clip frictionally securing the hanger member in position; and attaching a grid support member of the ceiling system to the mounting bracket with the hanger member.

BRIEF DESCRIPTION OF THE DRAWINGS

The features of the exemplary embodiments of the present invention will be described with reference to the following drawings, where like elements are labeled similarly, and in which:

FIGS. 29 and 30 are front and rear perspective views respectively of a fifth embodiment of a grid hanger according to the present disclosure;

Figure 1:
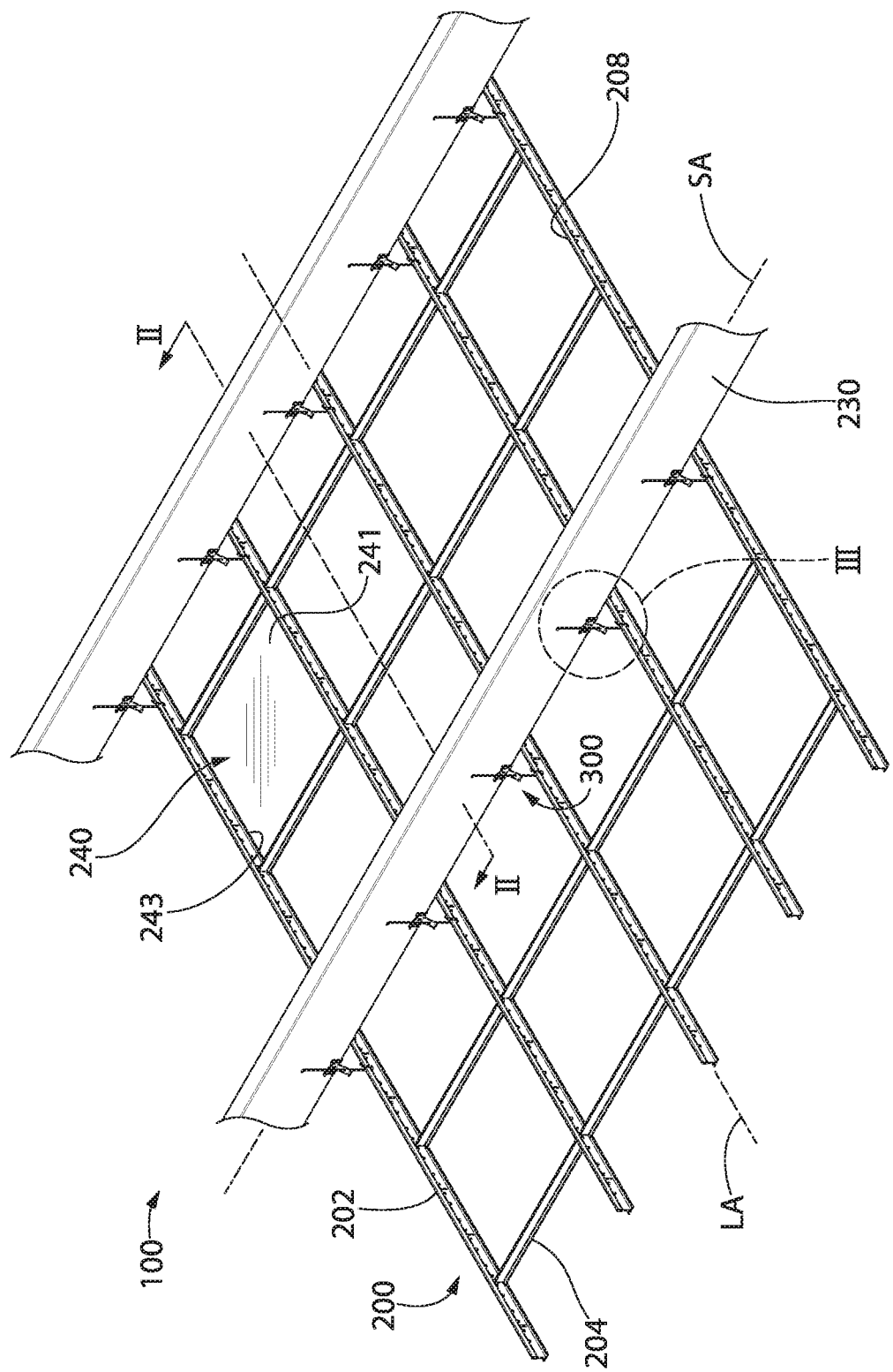
FIG. 1 is a top perspective view a ceiling system including an overhead suspended ceiling support grid and ceiling panels according to the present disclosure.
Figure 2:
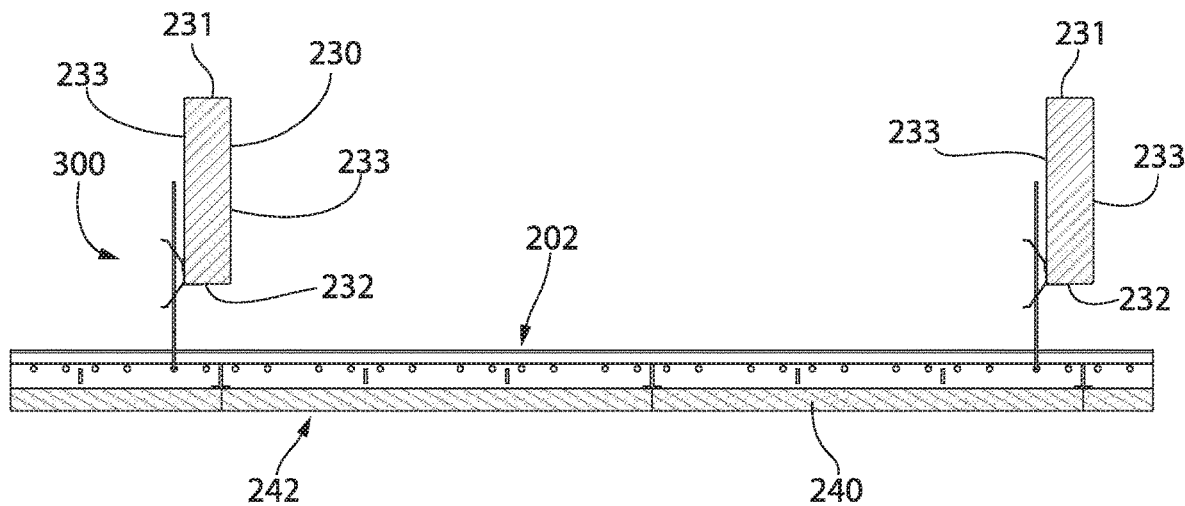
FIG. 2 is a cross-sectional view taken from FIG. 1.
Figure 3:
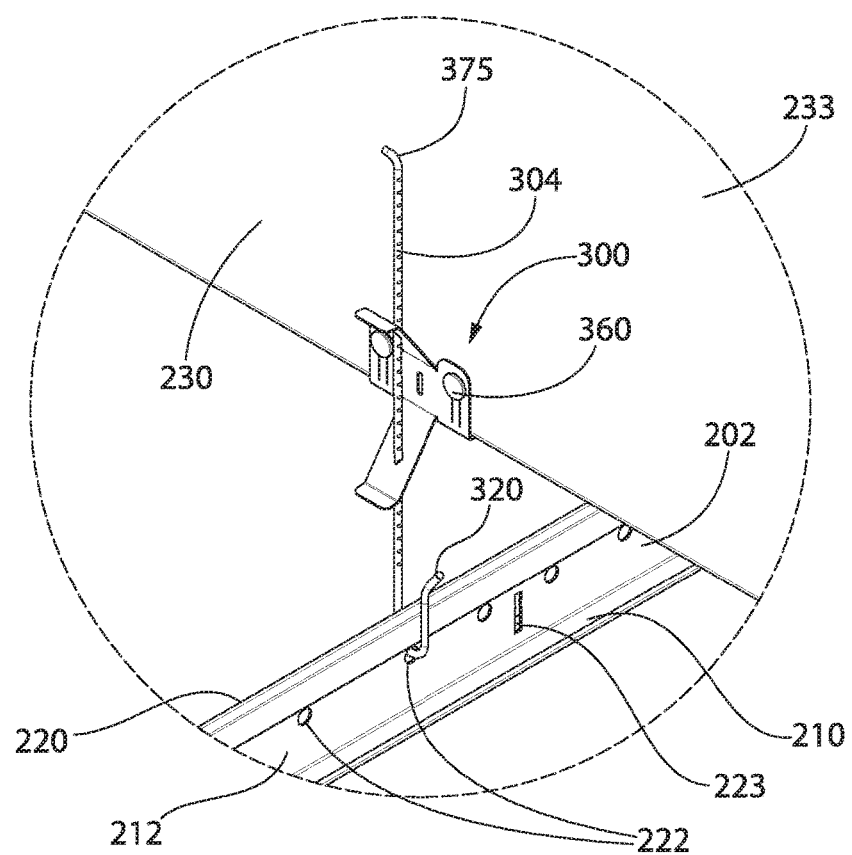
FIG. 3 is an enlarged detail taken from FIG. 1.
Figure 4:
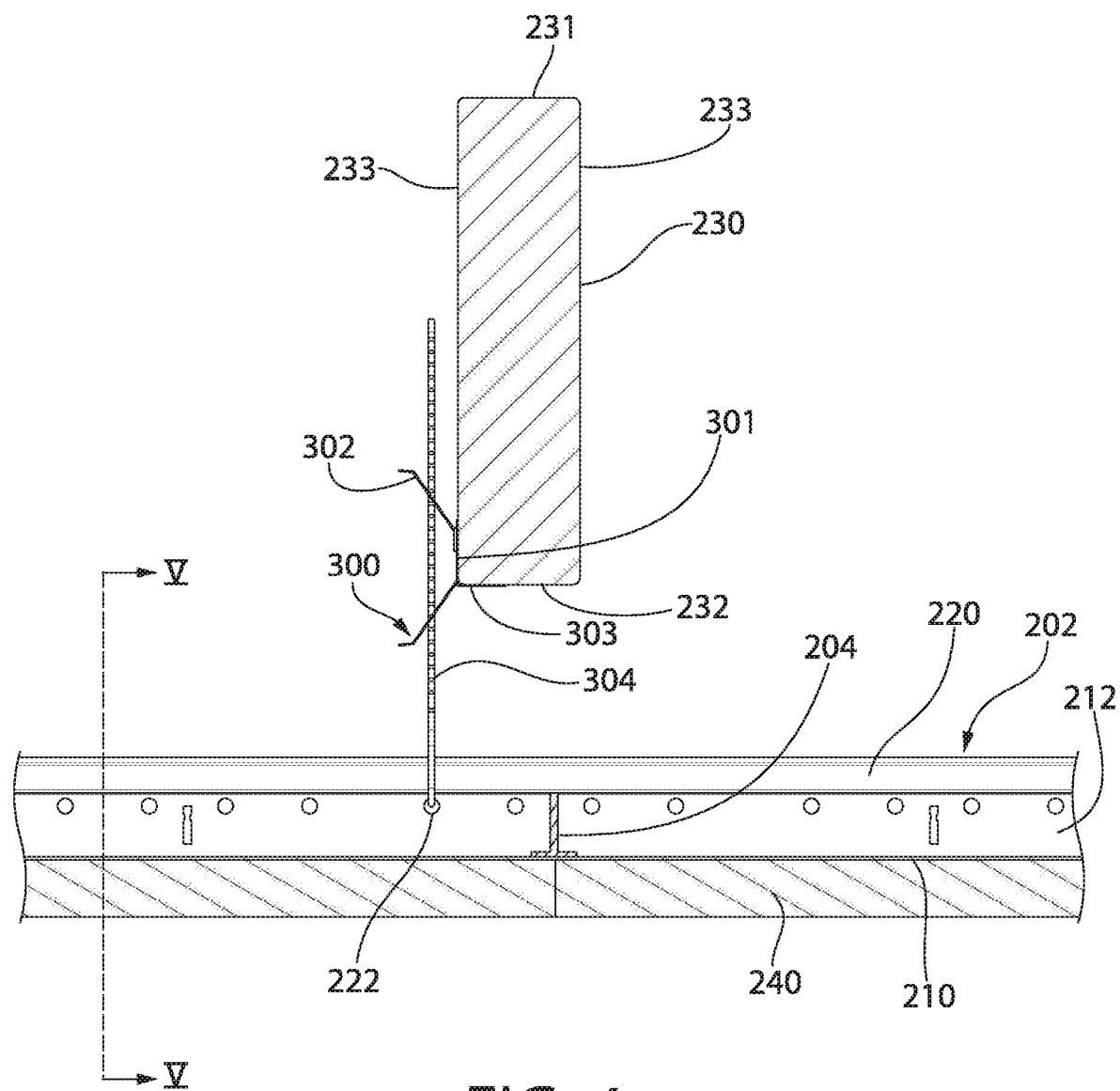
FIG. 4 is longitudinal cross-sectional view.
Figure 5:
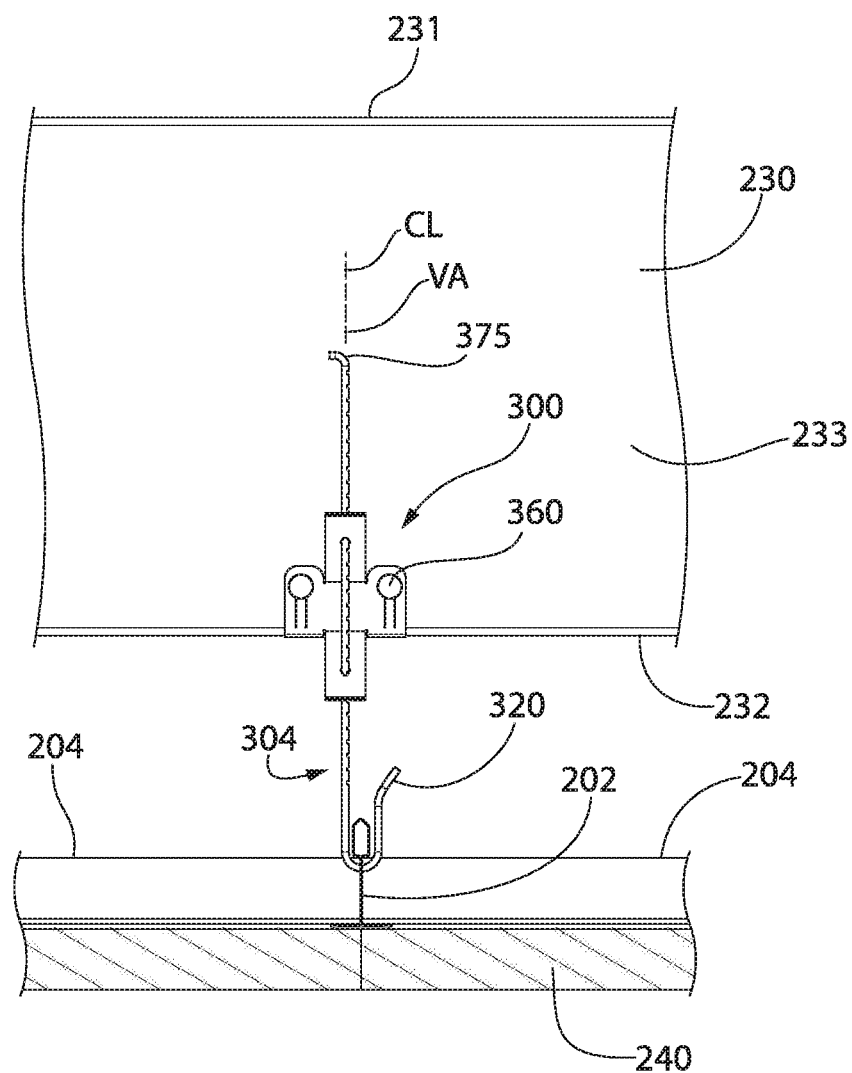
FIG. 5 is a transverse cross-sectional view taken from FIG. 4.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

FIGS. 1-5 depict a non-limiting embodiment of a ceiling system 100 according to the present disclosure. The ceiling system 100 includes an overhead support grid 200 mountable in a suspended manner from an overhead building support structure. Support grid 200 includes a plurality intersecting longitudinal grid support members 202 and lateral grid support members 204. Longitudinal and lateral grid support members 202, 204 are elongated in shape having a length greater than their respective width (e.g. at least twice), and in various embodiments lengths substantially greater than their widths (e.g. 3 times or more). Longitudinal grid support member 202 may have a substantially greater length than lateral grid support member 204 and form "runners" or "rails" which are maintained in a substantially parallel spaced apart relationship by the lateral grid support members. The longitudinal grid support members 202 are typically hung from and supported by a suitable overhead support structure in the building. The lateral grid support members 204 may be attached between adjacent (but spaced apart) longitudinal grid support members 202 at appropriate intervals using any suitable permanent or detachable manner employed in the art. The combination of interconnected longitudinal and lateral grid support members 202, 204 provides lateral stability to the support grid 200.

In one embodiment, grid support members 202 and 204 may be horizontally oriented when installed. It will be appreciated, however, that other suitable mounted orientations of support members 202, 204 such as angled or slanted (i.e. between 0 and 90 degrees to horizontal). Accordingly, although support members 202, 204 may be described in one exemplary orientation herein as horizontal, the invention is not limited to this orientation alone and other orientations may be used.

Longitudinal and lateral grid support members 202, 204 intersect to form an array of grid openings 208 which become essentially closed by ceiling panels 240 mounted below and/or within the openings to the support grid. In some embodiments, the grid support members 202, 204 may be arranged in an orthogonal pattern wherein the support members intersect at right angles to form rectilinear grid openings 208 such as squares or rectangles (in top plan view). The terminal ends of the lateral grid support members 204 may be configured to interlock with the transversely oriented longitudinal grid support members 202 at right angles to form the rectilinear grid pattern in any manner used in the art. Any suitable interlocking mechanism and configuration may be used, including for example without limitation interlocking tabs and slots, brackets, clips, etc. Accordingly, the present invention is not limited by the manner of attachment used.

Longitudinal and lateral grid support members 202, 204 may be T-shaped (e.g. T-rails) in transverse cross section. The grid support members have an inverted T-shaped configuration when in an installed position suspended from an overhead building ceiling support structure using any of the grid hangers disclosed herein.

Figure 6:
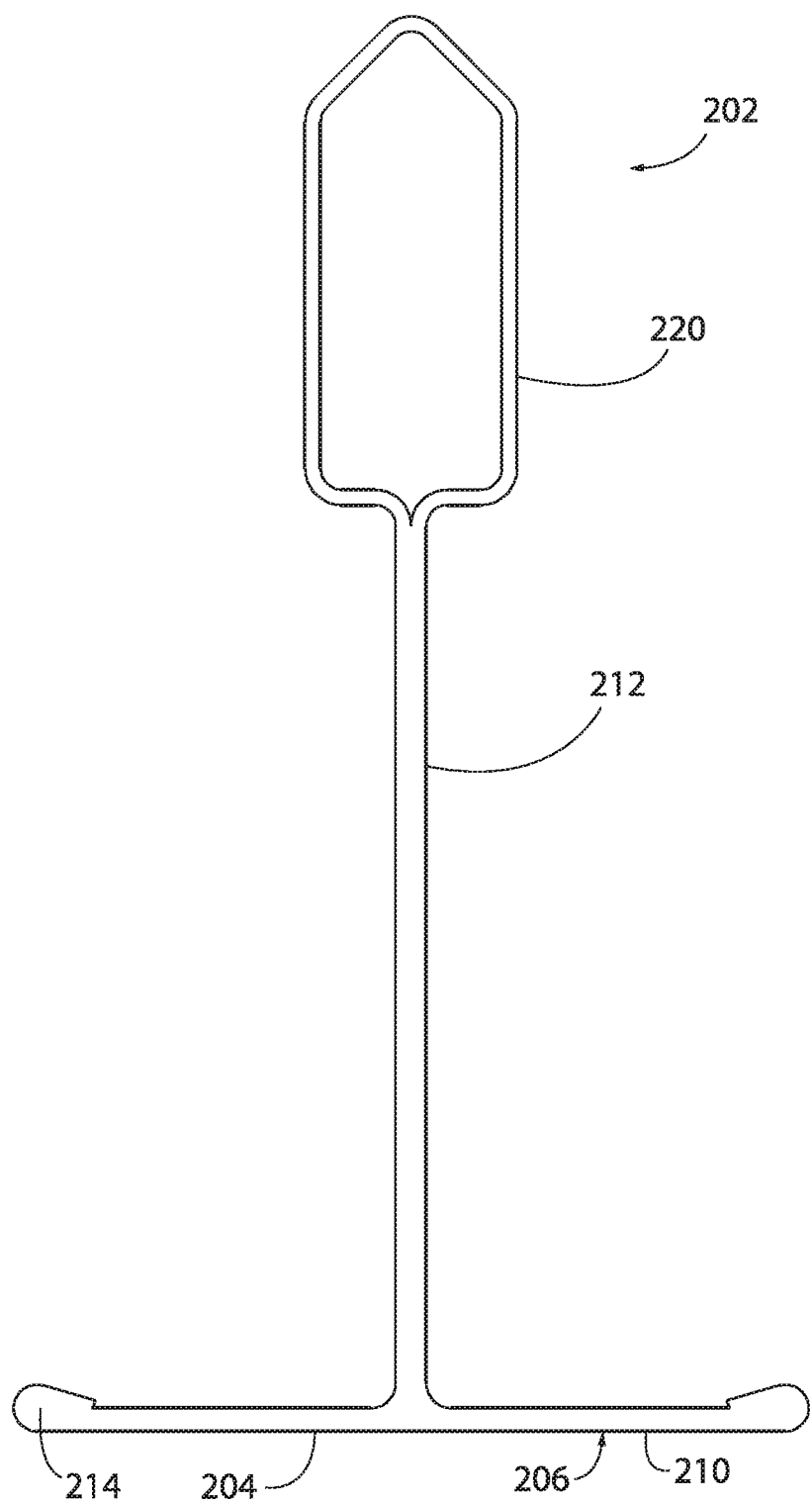
FIG. 6 is a transverse cross-sectional view of a longitudinal grid support member.
Figure 7:
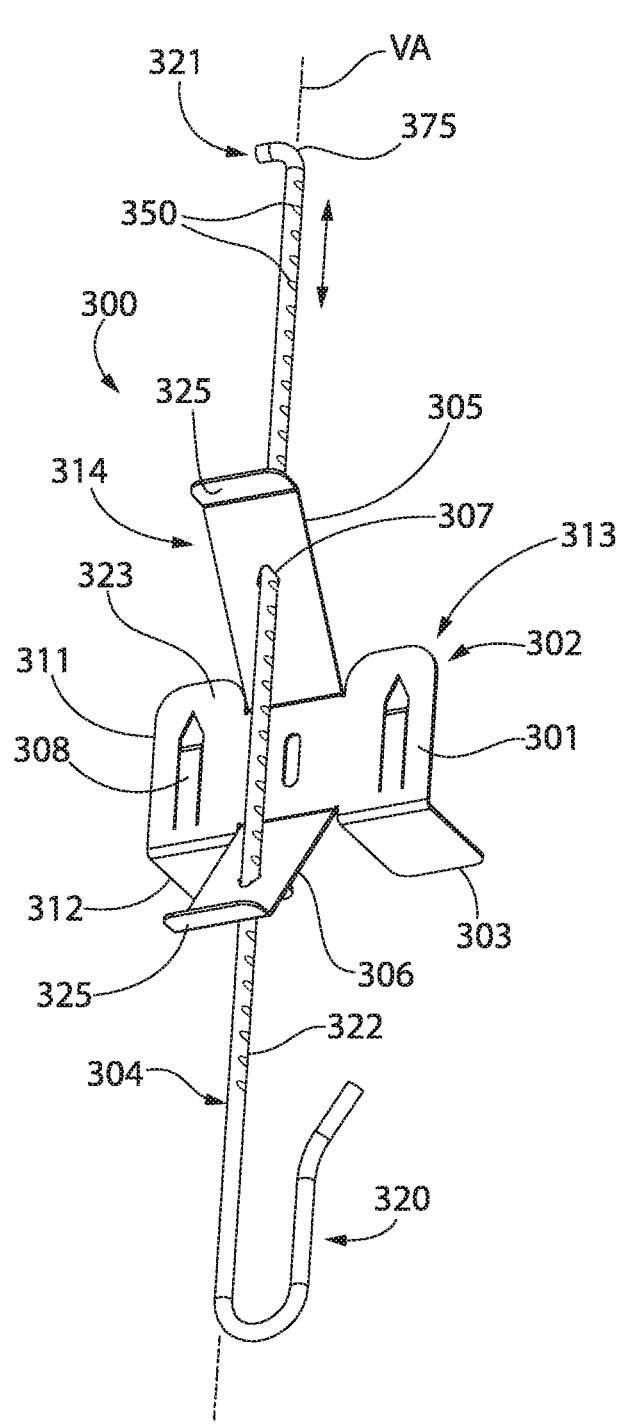
FIGS. 7 and 8 are front and rear perspective views respectively of a first embodiment of a grid hanger according to the present disclosure.
Figure 8:
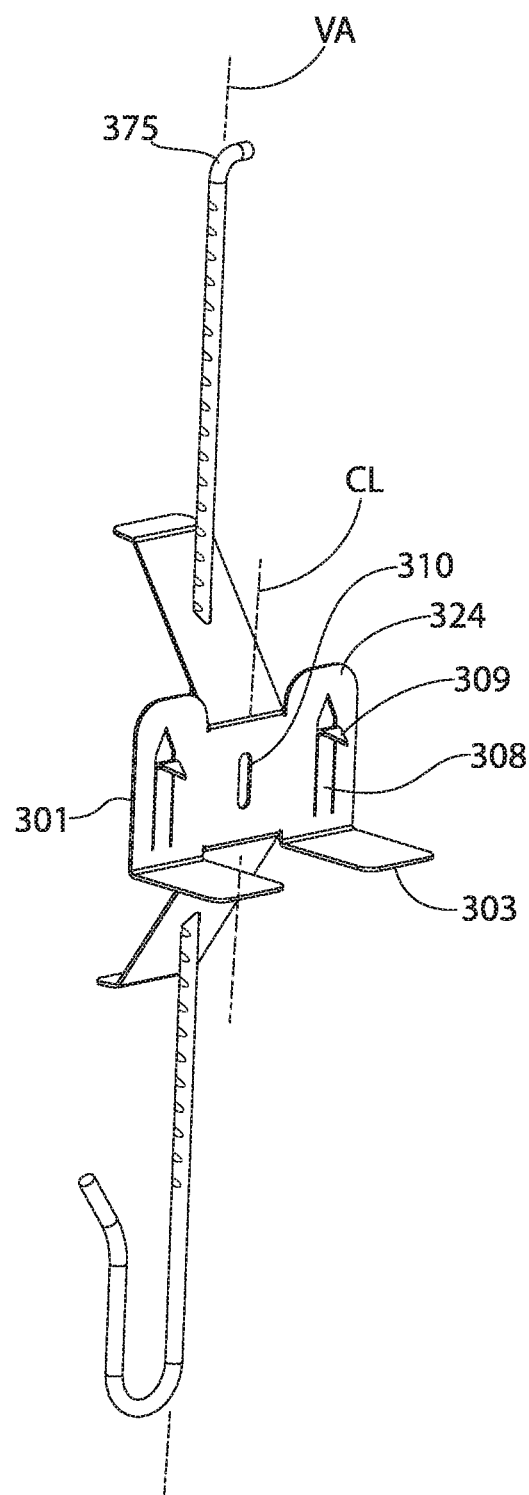
Figure 9:
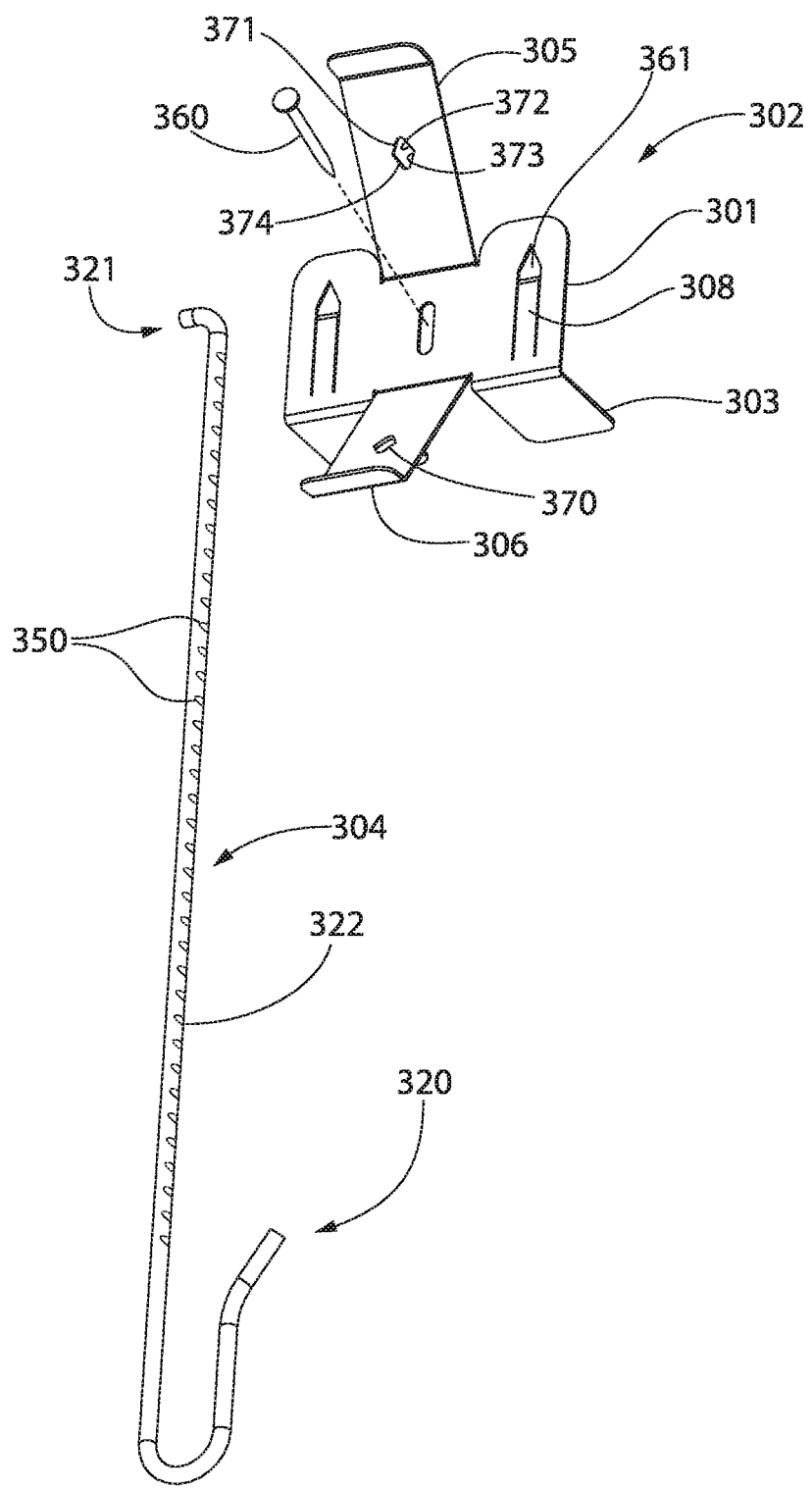
FIG. 9 is an exploded perspective view thereof.
Figure 11:
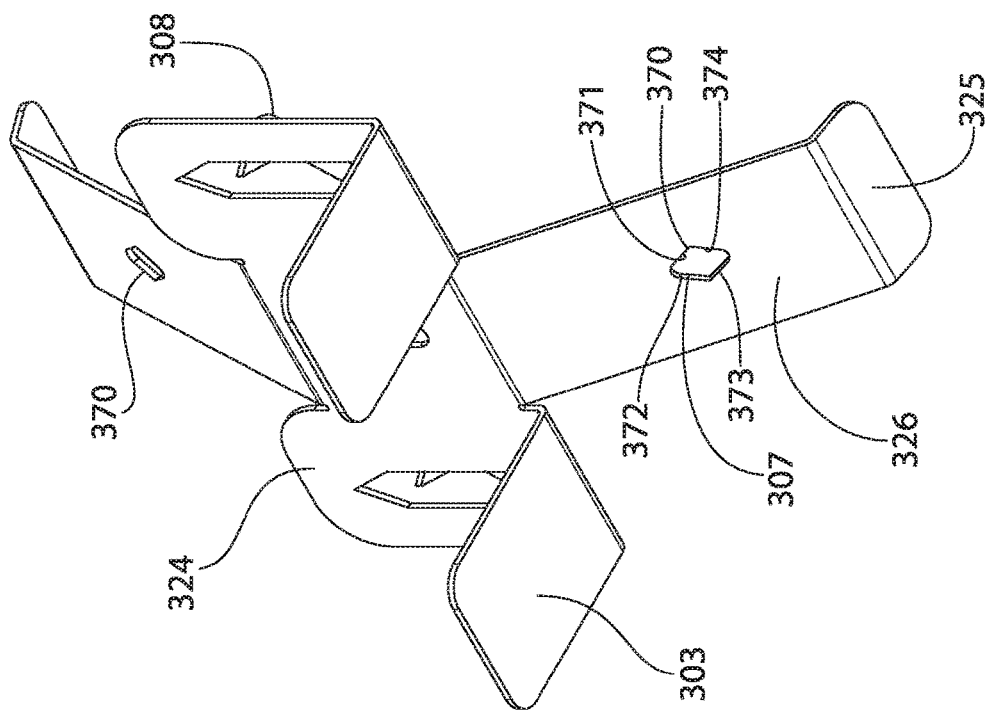
FIGS. 10 and 11 are front and rear perspective views respectively of the mounting bracket of the first embodiment.
Figure 10:
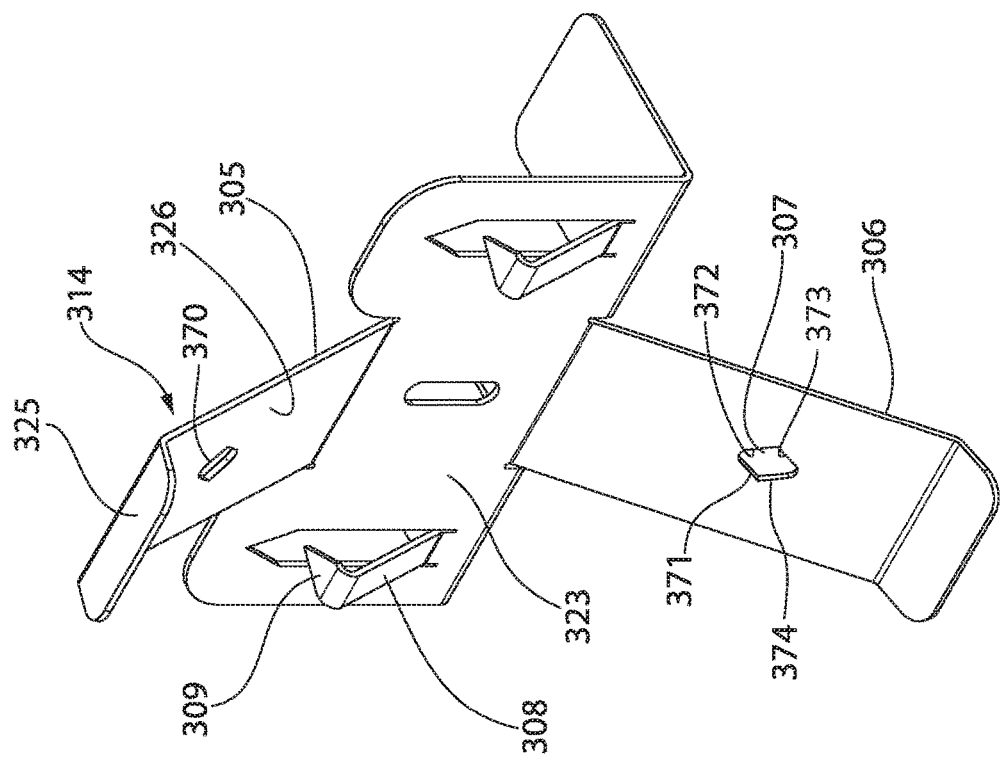
Figure 13:
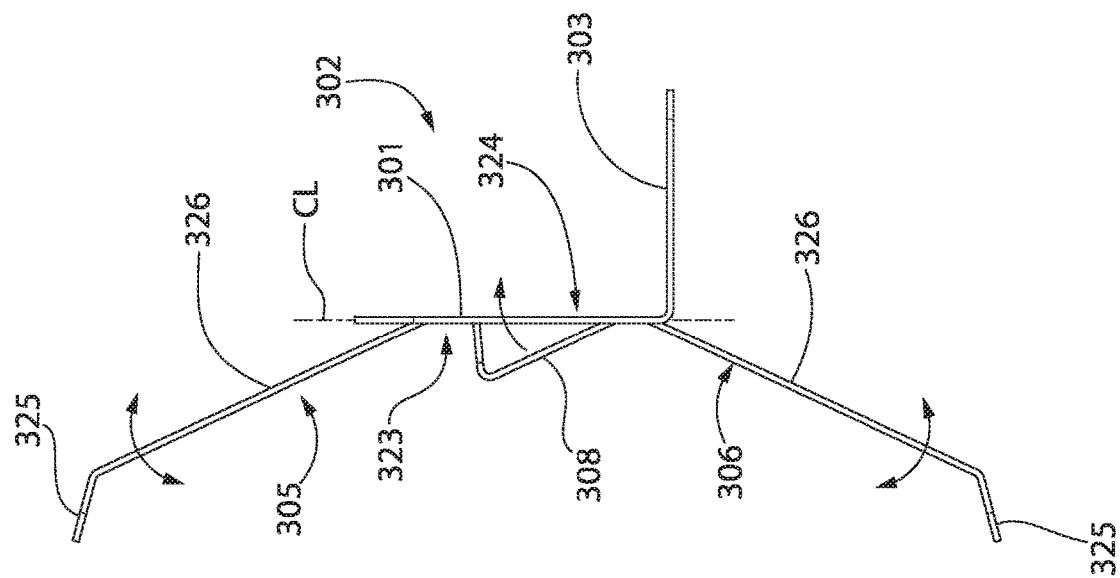
FIG. 13 is a side view thereof.
Figure 12:
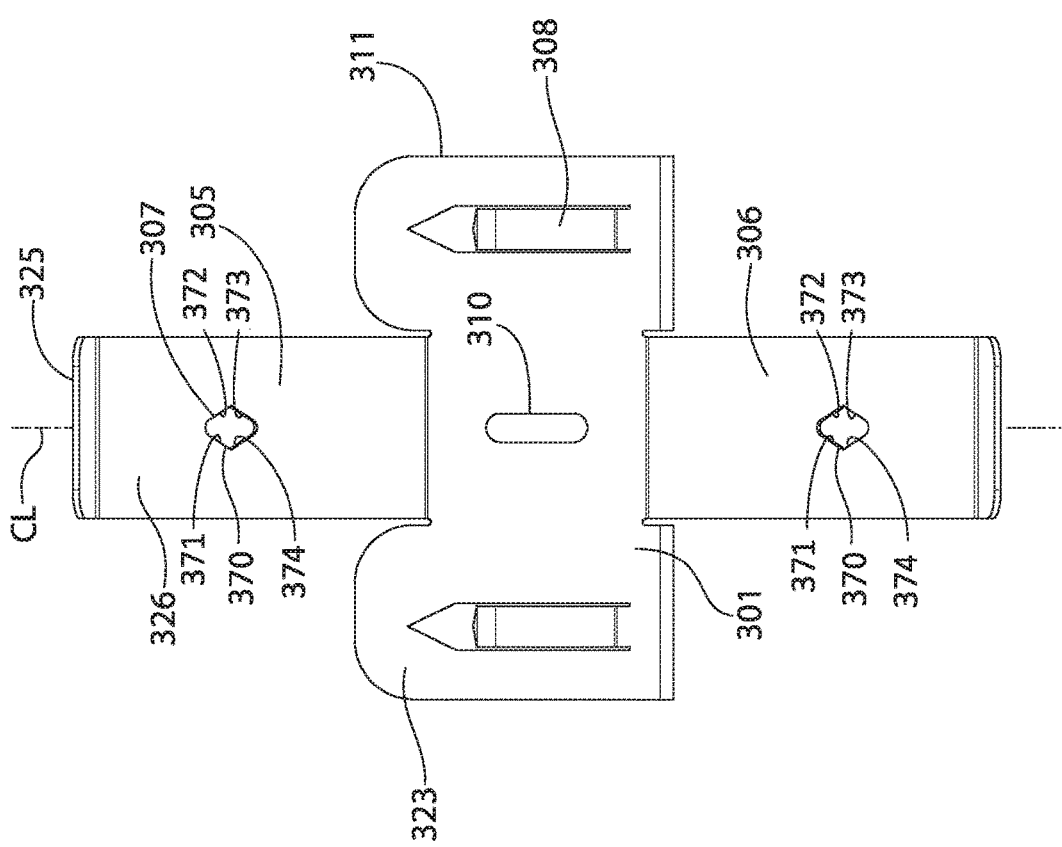
FIG. 12 is a front view thereof.
Figures 14, 15, 16:
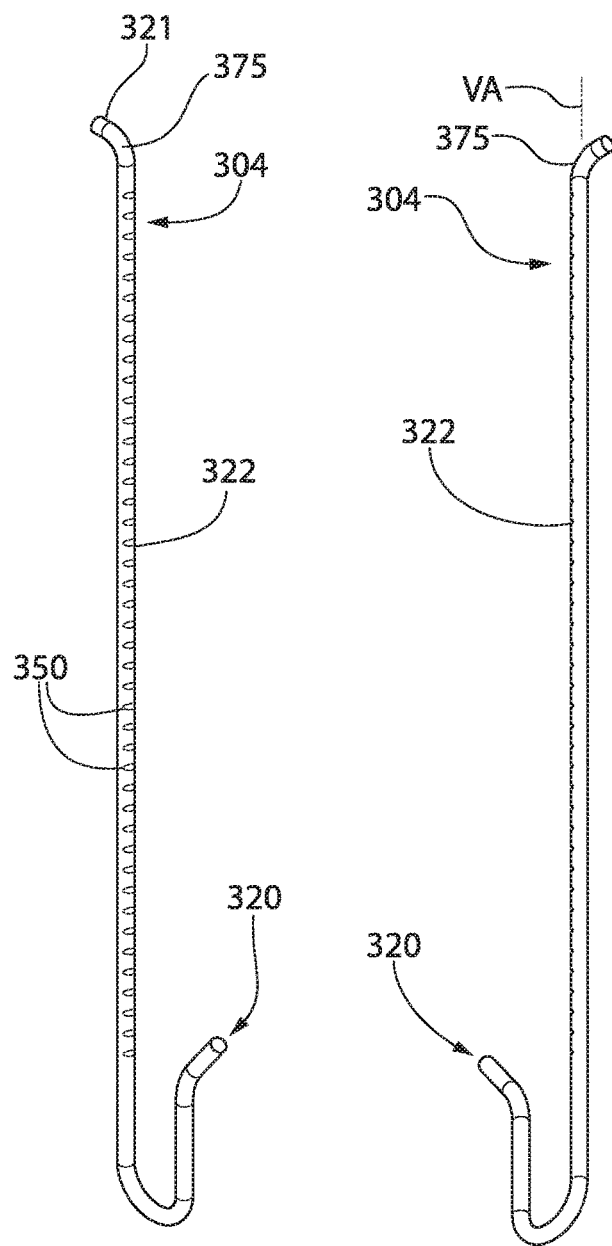
FIGS. 14-15 are perspective views of the hanger member of the first embodiment taken from different angles.
FIG. 16 is a side view thereof.

Because the longitudinal grid support members 202 primarily support the weight of the ceiling panels via attachment to the building ceiling support structure, they may have a slightly more robust construction than the lateral grid support members 204 which serve to provide lateral stiffness to the support grid and maintain the dimensions of the grid openings in which the ceiling panels 240 are installed. Referring to FIG. 6, longitudinal grid support members 202 include a longitudinally-extending horizontal bottom flange 210, a bulbous top stiffening channel 220, and a vertical web 212 extending upwards from the flange to the stiffening channel. The longitudinal grid support members 202 each define a respective longitudinal axis LA and axial directions. Web 212 may be centered between opposing longitudinally extending edges 214 of flange 210 in one embodiment.

Bottom flange 210 has opposing portions which extend laterally outwards from web 212 and terminate in opposed longitudinally extending edges 214. In one embodiment, edges 214 may have a slightly enlarged bulbous configuration in transverse cross-section. Bottom flange 210 further defines a bottom surface 206 facing downwards away from the flange and towards a room or space below the support grid 200. Bottom surface 206 defines a horizontal reference plane for the overhead support grid 200.

In some embodiments, the longitudinal grid support members 202 may include a plurality of mounting holes 222 to facilitate hanging the members from a ceiling overhead structural support in the building. The mounting holes 222 are configured to receive and engage grid support hangers, as further described herein. The mounting through holes may be formed in the web 212 of the grid support members 202. Elongated slots 223, which may be vertical, may be formed in the webs 212 for insertion of tabs (not shown) from the ends of the lateral grid support members 204 for connecting these lateral members between a pair of longitudinal grid support members 202 as shown.

Grid support members 202, 204 may be made of any suitable metallic or non-metallic materials structured to support the dead weight or load of ceiling panels 240 without undue deflection. In some preferred but non-limiting embodiments, the grid support members may be made of metal including aluminum, titanium, steel, or other. In one embodiment, the grid support members 202, 204 may be a standard heavy duty $15/16$ inch aluminum T-rail.

Referring to FIGS. 1-5, various types of ceiling overhead structural support in the building may be used with the present grid mounting system for mounting the grid support members 202, 204 thereto. In one embodiment, the overhead support structures may be support joists 230 depicted in the illustrated embodiment as a non-limiting example. Joists 230 are axially elongated structures including a top surface 231, opposite bottom surface 232, and pair of opposed sides 233 extending therebetween. These surfaces may each be substantially flat in some embodiments as shown; however, curved or undulating surfaces are possible. Joist 230 may have a rectilinear transverse cross sections in one embodiment such as rectangular or square (rectangle with equal sides); however, other shaped joist are possible. Joists 230 are arranged generally transverse to the longitudinal grid support members 202 and parallel to the lateral grid support members 204 in one embodiment. Each joist 230 defines a support axis SA orthogonal to the longitudinal axes LA of the longitudinal grid support members 202. Bottom surfaces 232 of at least a majority of the joists may generally lie in the same horizontal plane in a typical building structure; however, not all joists may necessarily lie in that same plane depending on the building superstructure or other factors.

Joists 230 may be made of various materials. In one embodiment, joists 230 may be solid structures having internal cores as illustrated comprised of wood and/or wood products. The joists 230 may be natural solid wooden members, or engineered wood products formed by heating and compressing a combination of wood fibers, pieces, saw dust, binders, resins, etc. In other possible embodiments, the joists 230 may have hollow cores. Joists 230 may have any suitable dimensions, such as for example without limitation 2×12 inches, 2×10 inches, 2×8 inches, 2×6 inches, 2×4 inches, etc. The 2×10 or 2×12 inch joists are typically used for decking and ceiling construction, but the invention is not limited to these joist sizes alone. The ends and/or intermediate parts of the joists 230 may be supported by the building superstructure in a typical manner.

With continuing reference to FIGS. 1-5, any suitable type of ceiling panel 240 may be used in the present ceiling and grid support systems. Ceiling panel 240 may have a generally flattened body with a substantially greater horizontal width and length than vertical thickness as shown. Ceiling panel 240 includes a top surface 241, opposite bottom surface 242, and lateral sides 243 extending therebetween along four sides of the panel. Top and bottom surfaces 241, 242 may be generally planar and arranged parallel to each other in one embodiment. In one non-limiting embodiment, the lateral sides 243 may be planar forming opposing pairs of parallel lateral sides.

It will be appreciated that the top and bottom surfaces 241, 242 of ceiling panels 240 may have other configurations or surface profiles rather than planar. In other possible configurations, the top and bottom surfaces 241, 242 may have irregular surfaces including various undulating patterns, designs, textures, perforations, ridges/valleys, wavy raised features, or other configurations for aesthetic and/or acoustic (e.g. sound reflection or dampening) purposes. Accordingly, top and bottom surfaces 241, 242 are not limited to any particular surface profile or configuration. The invention is therefore not limited to any of the particular foregoing constructions.

Ceiling panels 240 may be constructed of any suitable material including without limitation mineral fiber board, fiberglass, jute fiber, metals, polymers, wood, or other. In addition, the ceiling panels 240 may have any suitable dimensions and shapes (in top plan view) including without limitation square or rectangular. The ceiling panels 240 may be mounted to and supported from the overhead support grid 200 (i.e. longitudinal and lateral grid support members 202, 204) by any suitable means and in an suitable position known in the art. Examples of mounting options include panel edge engagement with the support grid, clips, brackets, or other mounting techniques.

Elements of the present grid mounting system will now be further described. The longitudinal grid support members 202 may be mounted and hung from the overhead ceiling structural support by grid hangers. The present application discloses a variety of suitable grid hangers for this purpose.

FIGS. 1-5 disclose a first embodiment of a grid hanger 300 for mounting the support grid to the joists 230. FIGS. 7-16 are detailed views of the grid hanger 300. Hanger 300 includes an L-shaped mounting bracket 302 configured for attachment to overhead support joist 230 and a hanger member 304 slideably coupled thereto for coupling to a longitudinal grid support member 202. Mounting bracket 302 includes mounting portion 313 comprising an angled body including a horizontal bottom flange 303 and adjoining vertical side flange 301 extending upwards from the bottom flange. The mounting portion 313 defines a vertical mounting centerline CL which passes through the geometric center of the side flange 301 as shown. The bottom and side flanges 303, 301 may be formed as integral unitary structural parts of the mounting bracket body which is bent to form the flanges. In other embodiments, the flanges 301, 303 may be separate components attached together by suitable means such as welding, brazing, soldering, etc. In one embodiment, side flange 301 is disposed perpendicularly to bottom flange 303. When attached to support joist 230, bottom flange 303 engages the bottom surface 232 and side flange 301 engages a side surface 233 of the joist (see, e.g. FIGS. 4 and 5). In one embodiment, bottom flange 303 may be bifurcated comprising a pair of laterally spaced apart first and second flange sections as shown.

The vertical side flange 301 may have a width coextensive with the width of bottom flange 303 as best shown in FIGS. 7-8 and 10-11. Accordingly, the peripheral side edges 311 of side flange 301 may be aligned with the peripheral side edges 312 of bottom flange 303. Side flange 301 includes features to facilitate attachment to support joist 230. In one embodiment, flange 301 includes at least one but preferably a pair of resiliently flexible cantilevered securement tabs 308 movable relative to a body of the mounting bracket mounting portion 302. Securement tabs 308 each include a bottom end formed integrally with the mounting bracket 302 and a pointed free end 309 bent angularly and obliquely to the body of tab as shown. The bottom ends form living hinges and define an axis of rotation. The tabs 308 may be cut directly from the mounting portion 313 of mounting bracket 302 forming open slots when the tabs are bent to the ready to install position shown in the referenced figures.

In operation, after the mounting bracket 302 is abutted against the support joist 230, the securement tabs 308 may be horizontally deflected by hammering them into the side surface 233 of the joist. The pointed ends 309 at least partially penetrate the joist to at least temporarily hold the bracket in position thereto. A fastener 360, which may be a screw or nail, can then be installed through a mounting aperture such as a vertical slot 310 formed in the bracket mounting portion 313 to more permanently affix the mounting bracket 302 to the joist 230. Slot 310 may be disposed between the securement tabs 308. It bears noting that the slot permits vertical adjustment of the mounting bracket 302 relative to the support joist 230 if warranted by field installation conditions encountered to select a proper height of the bracket. For added security, additional fasteners 360 may also be driven through mounting openings 361 remaining in the mounting bracket side flange 301 from forming and bending each securement tab 308 (reference FIGS. 3 and 9). Alternatively, fasteners 360 may be driven through mounting openings 361 associated with each tab 308 instead of using the central mounting slot 310. In either case, the central slot is useful as a viewfinder for the installer to locate an installation mark made on the joist and properly locate the mounting bracket 302.

Although the bottom flange 303 of mounting bracket 302 is intended to normally abut the bottom surface 232 of the joist 230, it will be appreciated that in some implementations and applications the bottom flange 303 may be spatially separated from the bottom of the joist to provide additional height adjustment or to avoid mounting obstacles such as existing electrical or other wiring that might be secured to the bottom of the joist. The side flange 301 is sufficient for securely mounting the mounting bracket 302 to the joist.

Mounting bracket 302 further includes a movable securement member configured and operable to lock hanger member 304 in a plurality of selectable vertical mounting positions. In one embodiment, the securement member may be a spring clip 314 attached to or formed as an integral unitary structural part of the mounting bracket as illustrated. Spring clip 314 includes two outwardly and laterally projecting spring arms 305, 306 obliquely angled in relation to each other forming generally a V-shaped structure. The arms may be located midway between the peripheral side edges of the bracket in one embodiment. In one arrangement, the arms 305, 306 extend outwards horizontally from a front side 323 of the mounting bracket 302 in a direction opposite to the bottom flange 303 that extends horizontally and perpendicularly to rear side 324 of the bracket. The arms can be considered to define a top arm 305 extending upwardly at an oblique angle to front side 323 of mounting bracket 302 and an opposed bottom arm 306 extending downwardly at an oblique angle to front side 323 of mounting bracket 302. Each arm 305, 306 is resiliently flexible and elastically deformable/deflectable together or apart in combined horizontal and vertical directions toward or away from the mounting centerline CL of the mounting bracket. The arms 305, 306 can thus translate or move angularly with respect to the vertical centerline CL due to the oblique orientation of the arms that produces the combined motion.

The spring clip 314 is movable between an undeflected/undeformed position or condition for retaining and locking the hanger member 304 in a selectable vertical position, and a deflected/deformed position or condition to allow vertical adjustment of the hanger member 304. Spring clip 314 has an elastic memory which causes the arms 305, 306 to move back towards the undeflected/undeformed position (shown in FIGS. 7-13) after being moved to and released from the deflected position. In the undeflected position, arms 305, 306 frictionally engage and apply an longitudinally acting tensile force on the hanger member 304 to lock the hanger member in vertical position, as further described herein.

The mounting bracket 302 including integrally formed spring clip spring arms 305, 306 may be formed of a thin metal sheet material in one embodiment, which is formed by a suitable fabrication method that may include stamping, cutting, bending, drilling, and/or other techniques to produce the shape as shown in the figures. In one embodiment, mounting bracket 302 inclusive of the spring arms may be made of spring steel in one non-limiting example; however, other suitable metals such as aluminum, titanium, and others may be used. In embodiments where the spring arms 305 306 are formed of separate pieces fixedly attached to mounting bracket 302, the arms may be made of a different material than the bracket.

Figure 39:
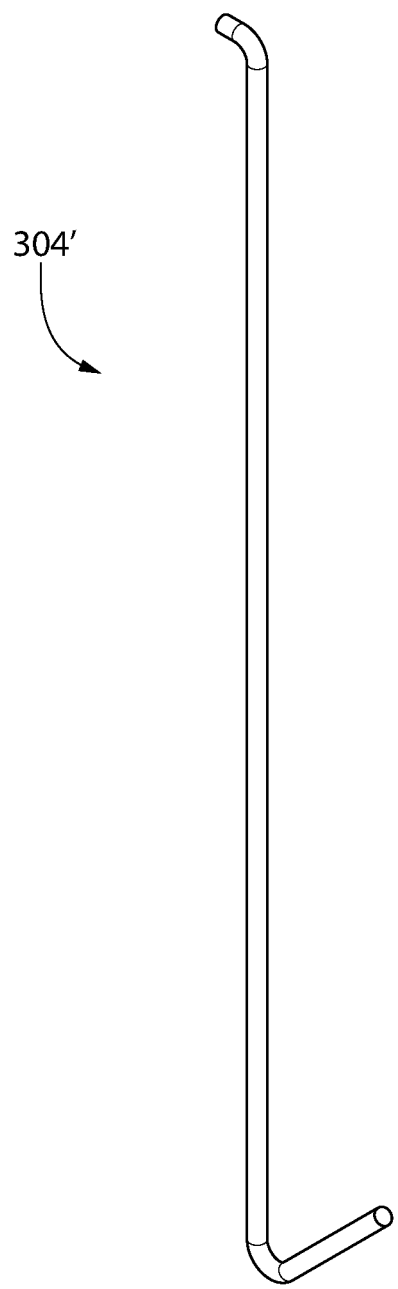
FIG. 39 is a perspective view of an alternative embodiment of hanger member in the form of a J-hook.

Hanger member 304 defines a vertical axis VA which is parallel to and offset from the mounting centerline CL of the mounting portion 313 of mounting bracket 302. Vertical axis may be located forward of the mounting centerline CL as shown. In one embodiment, hanger member 304 may be formed from a round metal wire or rod of suitable diameter which may be bent to the shape shown (see, e.g. FIGS. 14-16). Hanger member 304 includes a configured for coupling to one of the longitudinal grid support members 202 and an opposite top end 321. The coupling end 320 may be configured as a J-hook in one embodiment for insertion through one of the mounting holes 222 formed in grid support member 202 (see, e.g. FIGS. 4 and 5), thereby coupling the hanger member and grid support member together. An alternative embodiment of a hanger member 304' in the form of a J-hook is shown in FIG. 39. The bottom coupling end 320 of the J-hook in FIG. 39 is more angular and linear than the arcuately curved U-shaped coupling end of the J-hook shown in FIGS. 14-16. Of course, other types of coupling ends and configurations may be provided for attachment to the grid support member in other embodiments.

An intermediate portion 322 of hanger member 304 is slideably received through guide holes 307 in spring clip 314. In one embodiment, each spring arm 305, 306 includes a guide hole 307, which are spaced vertically apart on the spring clip as shown. Guide holes 307 may be diamond shaped in one embodiment; however, other polygonal and non-polygonal shapes such as round may also be used. As shown in FIGS. 9-12, the guide holes 307 are defined by an edge 370. In one embodiment, the edge 370 may have a first linear edge portion 371, a second linear edge portion 372, a third linear edge portion 373, and forth linear edge portion 374. The first linear edge portion 371 and second linear edge portion 372 converge upwardly towards each other, and the third linear edge portion 373 and fourth linear edge portion 374 converge downwardly towards each other. The hanger member 304 is frictionally engaged by the arms 305, 306 at the guide holes 307 when in the undeflected position. This locks the hanger member 304 in one of the plurality of selectable mounting positions via preventing slideable movement of the hanger member relative to the mounting bracket 302. The elastic memory increases the frictional hold on the hanger member when the spring arms 305, 306 of the spring clip 314 are in the undeflected position shown in the figures.

According to one aspect, embodiments of the hanger member 304 may further include an index feature to assist with frictionally locking the slideable hanger member 304 in vertical position via the spring arms 305, 306 of spring clip 314. The index feature may comprise a plurality of axially and vertically spaced apart index grooves or notches 350 recessed into the surface of hanger member 304, as shown in FIGS. 7-9, 14, and 16. Index notches 350 are in vertical and axial alignment along one side of hanger member 304. Index notches 350 are positioned to lockingly engage spring arms 305, 306 at the guide holes 307 when the spring clip 314 is in the undeflected and locked position, thereby advantageously increasing the frictional hold on the hanger member 304 in one of a plurality of selectable indexed mounting positions. Index notches 350 may be spaced uniformly apart by equal distances therebetween. The index notches 350 define discrete incremental mounting positions. In one embodiment, notches 350 may be V-shaped.

In use after the mounting bracket 302 is attached to the support joist 230 via fasteners (e.g. nails, screws, etc.) and securement tabs 308, an installer or user moves or squeezes the arms 305, 306 vertically together to the deflected position in which the arms are closer together than depicted. This position reduces the frictional force or hold between the hanger member 304 and spring clip 314 at the guide holes 307, thereby allowing the installer to slide the hanger member more easily to the desired vertical position or height. The installer then releases the spring clip, which returns to the spring-biased undeflected position. In one embodiment, each arm 305, 306 may include angled and bent flat terminal operating ends 325 to facilitate grasping with the installer's fingers for squeezing the spring arms together. Operating ends 325 are obliquely angled to inboard intermediate portions 326 of each arm 305, 306 (see, e.g. FIG. 13).

In one embodiment, the top end 321 of the hanger member 304 may be bent and curved as an L-shape having a portion that projects laterally and horizontally. This curved end 321 forms a vertical travel stop 375 restricting a range of vertical motion and position of the hanger member relative to the mounting bracket 302. If moved downwards to its fullest extent, the curved top end 321 engages the top spring arm 305 at the guide hole 307 to limit the height of the hanger member 304. This limits the lowest-most height of the hanger member 304 relative to the mounting bracket 302 and joist 230.

Mounting bracket 302 and hanger member 304 may be formed of any suitable material. In one embodiment, bracket 302 and hanger member 304 are preferably formed of a suitable metal such as steel; however, other types of metals or non-metallic materials may be used as appropriate. In one embodiment, bracket 302 is made of spring steel to provide the elastic memory and deformability discussed herein. In one embodiment, the steel used for the hanger member 304 (e.g. hook) has a lower hardness than the steel used for the bracket 302. Advantageously, this allows the bracket to more securely bite into and grip the hanger member 304 to secure it in position particularly in embodiments where index notches 350 might not be used on the hanger member.

Figure 17:
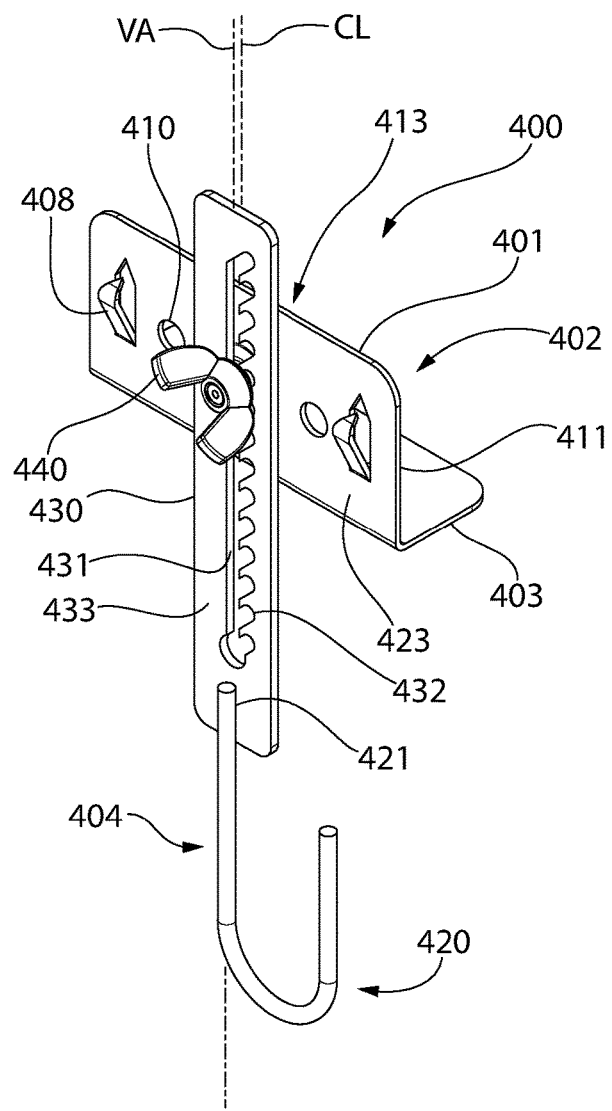
FIGS. 17 and 18 are front and rear perspective views respectively of a second embodiment of a grid hanger according to the present disclosure.
Figure 18:
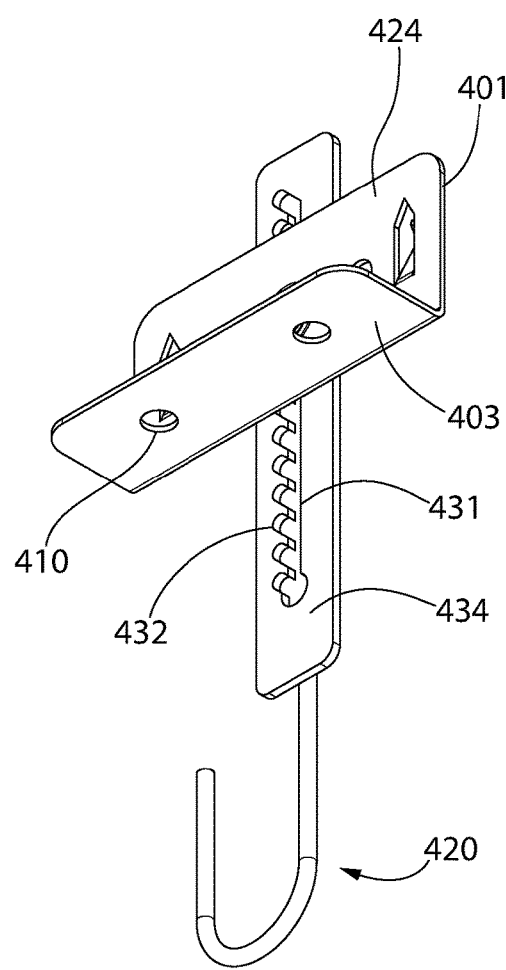
Figure 19:
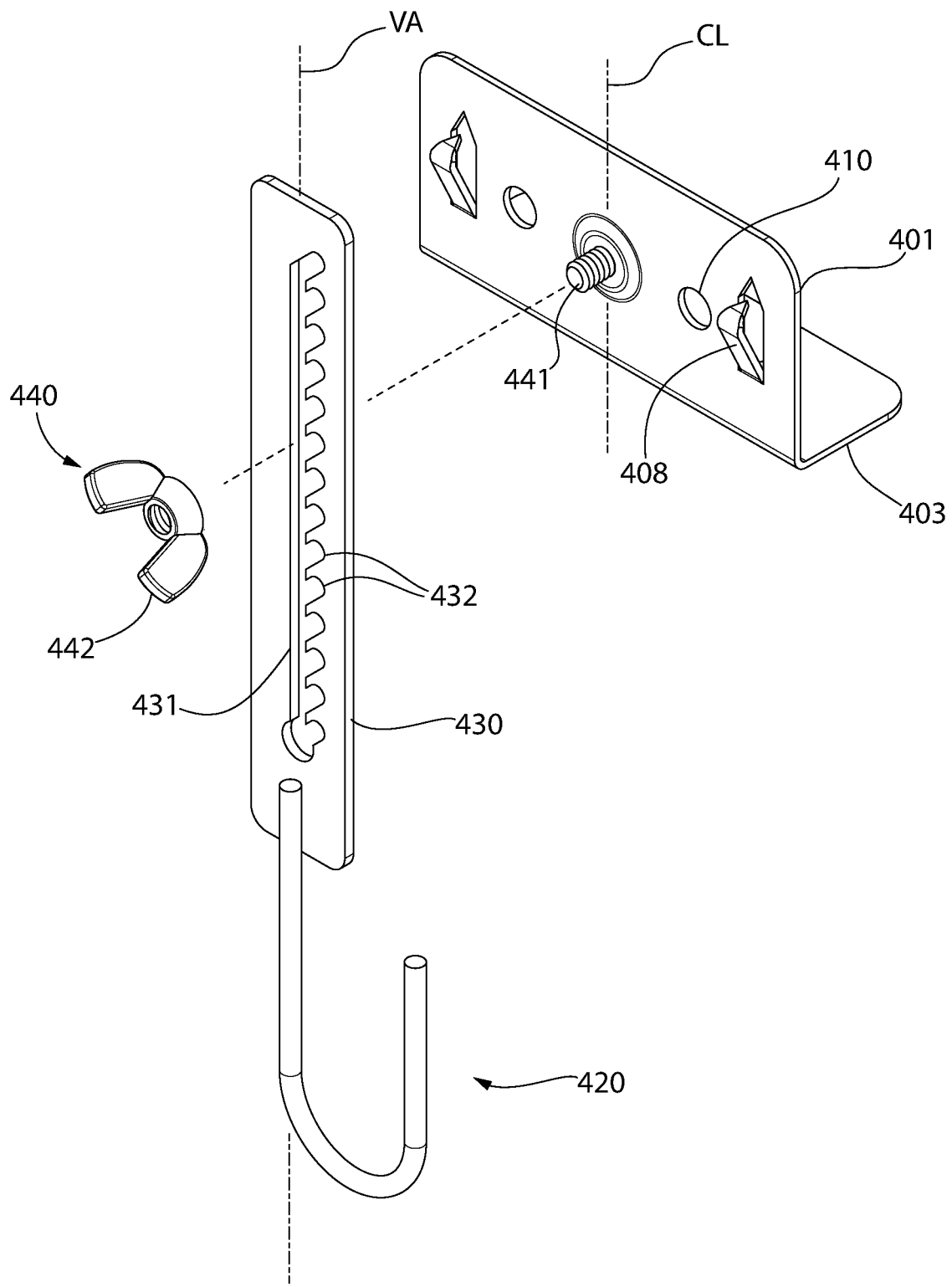
FIG. 19 is an exploded perspective view thereof.
Figure 20:
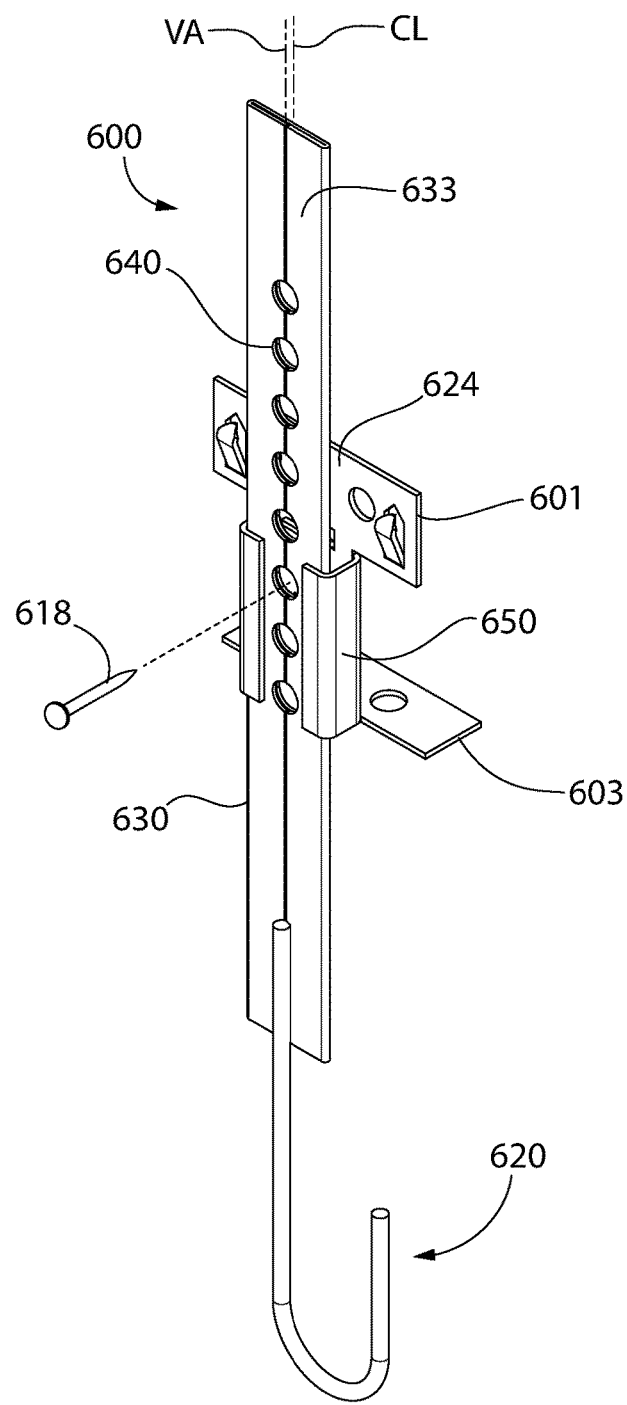
FIGS. 20 and 21 are front and rear perspective views respectively of a third embodiment of a grid hanger according to the present disclosure.

FIGS. 17-19 disclose another embodiment of a grid hanger 400 for mounting the support grid to the joists 230, which has indexed vertical adjustment positions. Grid hanger 400 contains elements similar to grid hanger 300 including a laterally elongated L-shaped mounting bracket 402 configured for attachment to overhead support joist 230 and a hanger member 404 slideably coupled thereto for coupling to a longitudinal grid support member 202. Mounting bracket 402 includes mounting portion 413 comprising an angled body including a horizontal bottom flange 403 and adjoining vertical side flange 401 extending upwards from the bottom flange. Mounting portion 413 defines a front side 423, rear side 424, and peripheral side edges 411 therebetween. The vertical side flange 401 may have a width coextensive with the width of bottom flange 403. In this embodiment, both side flange 401 and bottom flange 403 each includes at least one resiliently flexible cantilevered securement tabs 408 configured similarly to tab 308 already described herein. Securement tabs 408 are movable relative to the body of the mounting portion 413 of mounting bracket 402. Tabs 408 are operable to engage and at least temporarily hold mounting bracket 402 to a joist 230 in a similar manner to mounting bracket 302. A plurality of mounting apertures 410 such as round holes in this embodiment are provided in the bottom and side flanges 403, 401 that are configured to receive a fastener. The fastener, which may be a screw or nail, can then be installed through the mounting apertures 410 formed in the bracket mounting portion 413 to more permanently affix the mounting bracket 402 to the joist 230.

Similarly to hanger member 304, hanger member 404 includes a round wire or rod-like bottom lower coupling end 420 that may be configured as a J-hook in one embodiment for insertion through one of the mounting holes 222 formed in grid support member 202. A top straight portion 421 of coupling end 420 is fixedly attached to a laterally broadened and generally flat upper adjustment strap 430. Adjustment strap 430 has flat front and rear sides 433, 434 and may be vertically elongated as shown. The adjustment strap further includes an elongated vertical adjustment slot 431 configured with a plurality of lateral detent or index recesses 432 extending along one vertical lateral side of the slot for a majority of the length of the slot. The remaining opposite vertical lateral side of the slot 431 is linear and generally smooth. Each index recess 432 is angled obliquely upwards to the vertical length of the adjustment slot 431, as shown. This provides a plurality of selectable and incrementally indexed vertical mounting positions of the hanger member 404 relative to the mounting bracket 402. The linear or vertically stacked array 431 of index recesses 432 may extend for a majority of the length of slot 431 in one embodiment as shown. A plurality of generally pointed teeth are defined between the index recesses 432 as shown, thereby creating a sawtooth structure or toothed rack along one lateral side within the slot. The top and bottom ends of the slot 431 are closed. The closed top end of the slot 431 forms a vertical travel stop restricting the range of vertical motion and position of the hanger member relative to the mounting bracket 402. This limits the lowest-most height of the hanger member 404 relative to the mounting bracket 402 and joist 230. Index recesses 432 may be spaced uniformly apart by equal distances therebetween in one embodiment. The index recesses 432 define discrete incremental mounting positions.

Mounting bracket 402 further includes a movable securement member configured and operable to lock hanger member 404 in a plurality of selectable vertical mounting positions. In one embodiment, the securement member may be a locking element 440 such as a threaded fastener including a threaded shank or stud 441 that extends completely through the adjustment slot 431 and travels within the adjustment slot 431 of strap 430. The threaded stud 441 of locking element 440 engages the mounting portion 413 (side flange 401) of mounting bracket 402 at a fixed end of the stud. The fixed end of the stud 441 may be preferably welded or threadably engaged with the side flange 401 of bracket 402. A threaded nut such as a wing nut 442 threadably engages the free end of the threaded stud 441. The wing nut 442 engages the front surface of the upper adjustment strap 430 of the hanger member 404 when the nut is tightened to lock the strap in vertical position via frictional engagement. In other embodiments, the locking element 440 may be configured as wing-head thumb screw with attached threaded shank which threadably engages the side flange 401. Other types of threaded fasteners, however, may be used. The adjustment slot 431 is sufficiently wide so that the threaded stud 441 an travel vertically along the smooth linear side of the slot without engaging the index recesses 432. This enables the adjustment strap 430 to slide in position relative to the mounting bracket 402 for height adjustment.

A method of using grid hanger 400 is now described. In use after the mounting bracket 402 is attached to the support joist 230 via fasteners (e.g. nails, screws, etc.) and securement tabs 408, an installer or user rotates and loosens the threaded locking element 440 via the wing-shaped head. This reduces the frictional force or hold between the upper adjustment strap 430 of hanger member 404 and the mounting bracket 402, thereby allowing the installer to slide the hanger member up or down to the desired vertical position or height. The threaded shank or stud 441 of locking element 440 slides through the open smooth lateral side portion of the adjustment slot 431 without engaging the index recesses 432 of the toothed rack formed on the opposing lateral side portion of the slot. When the selected position is reached, the installer moves the upper adjustment strap 430 of hanger member 404 laterally (i.e. transversely to the length of slot 431) to insert and engage the threaded shank or stud 441 with one of the index recesses 432. The installer then tightens the locking element 440 via the wing nut 442, which increases the frictional force between the upper adjustment strap 430 of hanger member 404 and the mounting bracket 402 to lock the hanger member in the selected vertical position.

Figure 21:
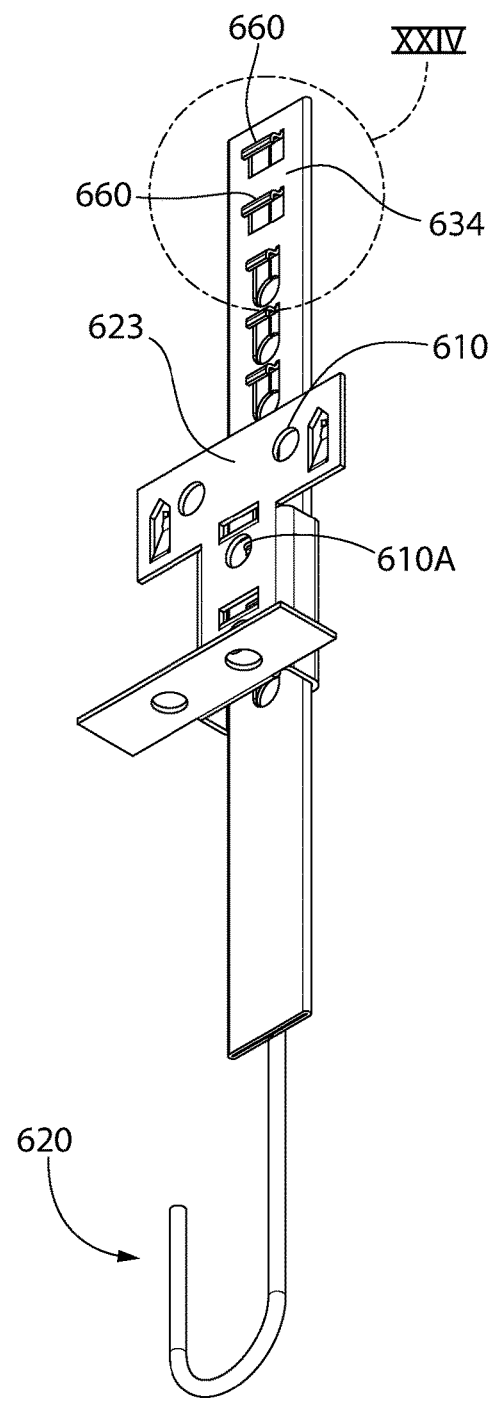
Figure 22:
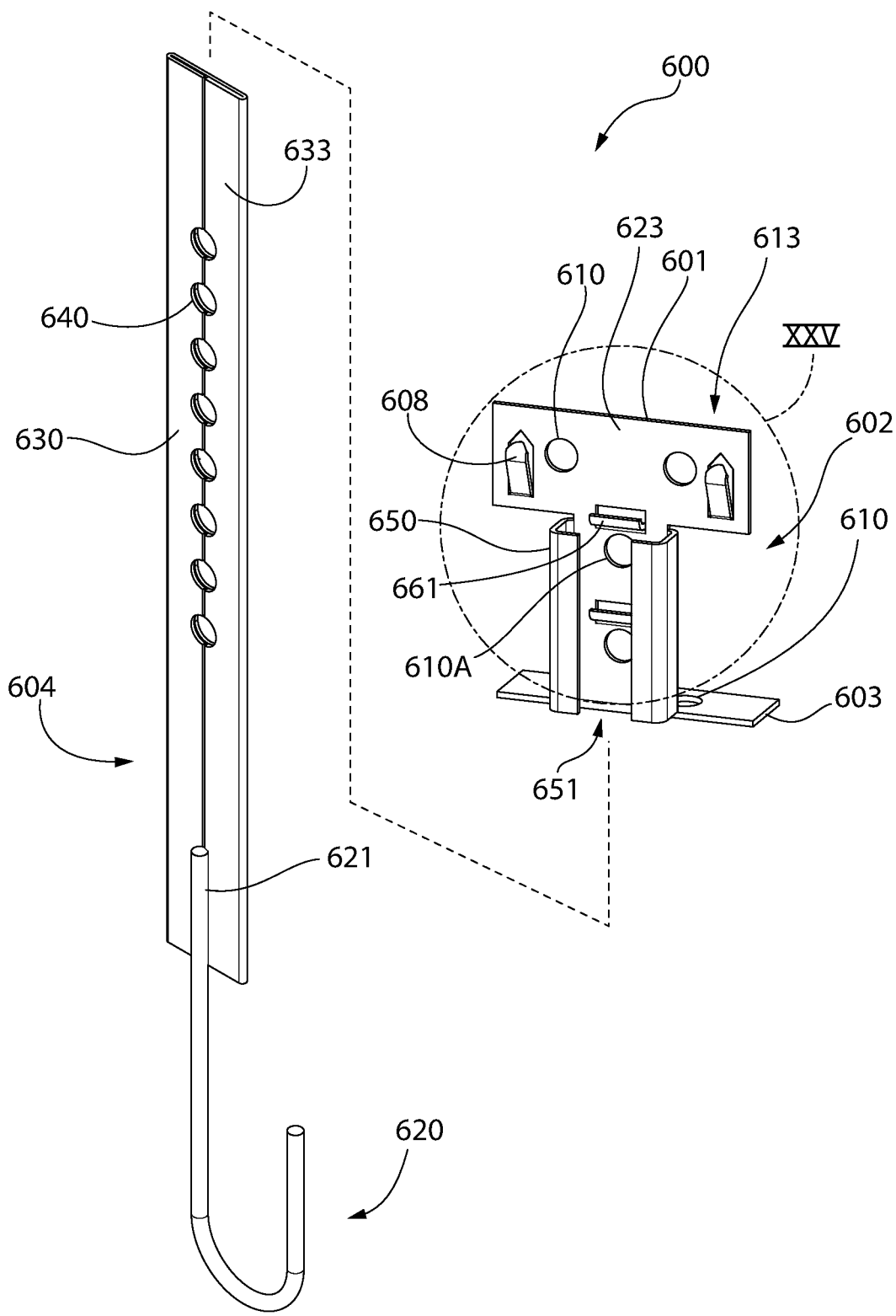
FIG. 22 is an exploded perspective view thereof.

It will be appreciated that the hanger member 404 is vertically adjustable when the locking element 440 is disengaged from the index recesses 432, and not vertically adjustable when the locking element is engaged with one of the index recesses. Advantageously, the hanger member 404 is rotatable and angularly adjustable when the locking element 440 is either engaged with or disengaged from one of the index recesses 432 when the locking element is loosened in the unlocked position. This installation flexibility allows the hanger member 404 (i.e. adjustment strap 430) to be titled or canted in the event the grid support member 202 is not directly below and in perfect vertical alignment with the strap 430). When the locking element 440 is tightened and engaged with one of the index recesses 430 in the locked position, the angular orientation of the adjustment strap 430 will be maintained. To further fix the angled position of the strap 430, a fastener such as a screw or nail (e.g. like fastener 618 shown in FIG. 21) may optionally be driven through an open index recess 432 into the support joist 230 thereby providing two points of fixation that prevents the strap from moving.

It bears noting that in this embodiment, the vertical axis VA of the hanger member 404 is parallel to and offset just slightly forward from the vertical mounting centerline CL of the mounting bracket 402 by the thickness of the upper adjustment strap 430. The centerline CL and vertical axis VA however lie in the same vertical plane midway between the peripheral edges 411 of the mounting bracket, and thus are in lateral alignment.

FIGS. 20-25 disclose another embodiment of a grid hanger 600 for mounting the support grid to the joists 230, which also has indexed vertical adjustment positions. Grid hanger 600 contains elements similar to grid hanger 300 including a laterally elongated L-shaped mounting bracket 602 configured for attachment to overhead support joist 230 and a hanger member 604 slideably coupled thereto for coupling to a longitudinal grid support member 202. Mounting bracket 602 includes mounting portion 613 comprising an angled body including a horizontal bottom flange 603 and adjoining vertical side flange 601 extending upwards from the bottom flange. Side flange 601 may be T-shaped one embodiment as depicted. Mounting portion 613 defines a front side 623, rear side 624, and peripheral side edges 611 therebetween. The vertical side flange 601 may have a width coextensive with the width of bottom flange 603. In this embodiment, side flange 601 includes at least one resiliently flexible cantilevered securement tabs 608 configured similarly to tab 308 already described herein. Securement tabs 608 are movable relative to the body of the mounting portion 613 of mounting bracket 602. Tabs 608 are operable to engage and at least temporarily hold mounting bracket 602 to a joist 230 in a similar manner to mounting bracket 302. A plurality of mounting apertures 610 such as round holes in this embodiment are provided in the bottom and side flanges 603, 601 that are configured to receive a fastener. The fastener, which may be a screw or nail, can then be installed through the mounting apertures 610 formed in the bracket mounting portion 613 to more permanently affix the mounting bracket 602 to the joist 230.

Similarly to hanger member 304, hanger member 604 includes a round wire or rod-like bottom lower coupling end 620 that may be configured as a J-hook in one embodiment for insertion through one of the mounting holes 222 formed in grid support member 202. A top straight portion 621 of coupling end 420 is fixedly attached to a laterally broadened and generally flat upper adjustment strap 630. Adjustment strap 630 has flat front and rear sides 633, 634 and may be vertically elongated as shown.

The adjustment strap 630 further includes a plurality of vertically spaced apart index holes 640 extending along the length of the strap and therethrough from front to rear. This provides a first index feature of the adjustment strap 630. Each index hole 640 is alignable with a corresponding fixation hole 610A formed in side flange 601 of mounting bracket 602 by sliding the strap 630 up and down along the side flange. This provides a plurality of selectable and indexed vertical mounting positions of the hanger member 604 relative to the mounting bracket 602. Index holes 640 may be spaced uniformly apart by equal distances therebetween.

To assist with sliding the adjustment strap 630 up and down along the mounting bracket 602, a pair of opposed guide rails 650 are disposed on the mounting bracket. Guide rails 650 are vertically elongated and spaced laterally apart forming a partially enclosed interior channel 651 configured to movably receive the adjustment strap 630. The rails 650 may be configured as structural angles each having a vertical first wall 652 fixedly disposed on vertical side flange 601 of mounting bracket 602 and an adjoining inwardly turned vertical second wall 653 arranged perpendicularly to the first wall. The first walls 652 extend perpendicularly to the vertical side flange 601 of the mounting bracket 602. The second walls 653 of each guide rail 650 extend towards each other and the mounting centerline CL of the mounting bracket. In the illustrated embodiment, the facing linear vertical edges of the second walls 653 do not meet and are spaced laterally apart to allow fastener 618 to be inserted through the channel 651 and one of holes 640 into fixation hole 610A and the support joist. The adjustment strap 630 is retained in the channel 651 during movement by the guide rails 650. There is sufficient front to rear clearance or "play" of the adjustment strap 630 within the guide rails 650 to allow mating index tabs 660, 661 described below to slide past each other during upwards or downwards movement of the adjustment strap 630.

Figure 23:
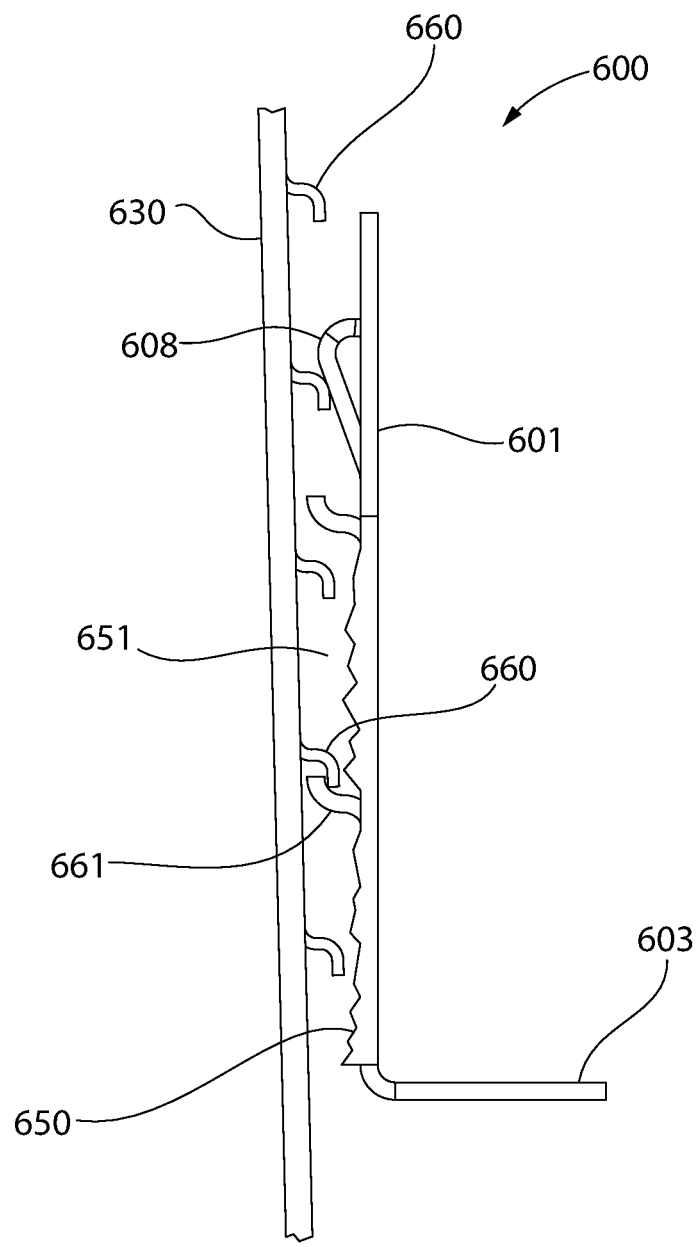
FIG. 23 is a partial side cross-sectional view showing details of interlocking index tabs of the mounting bracket and hanger member of the third embodiment.
Figure 24:
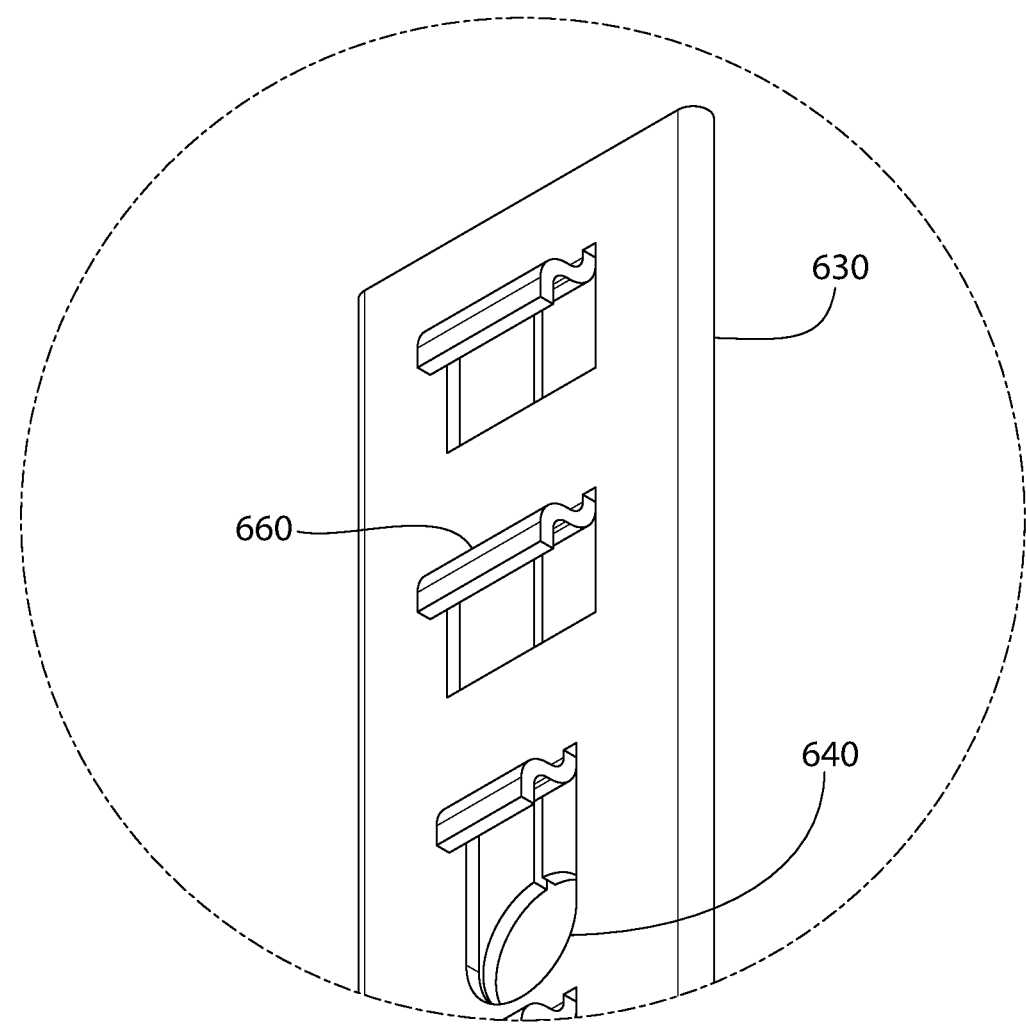
FIG. 24 is an enlarged detail taken from FIG. 21.
Figure 25:
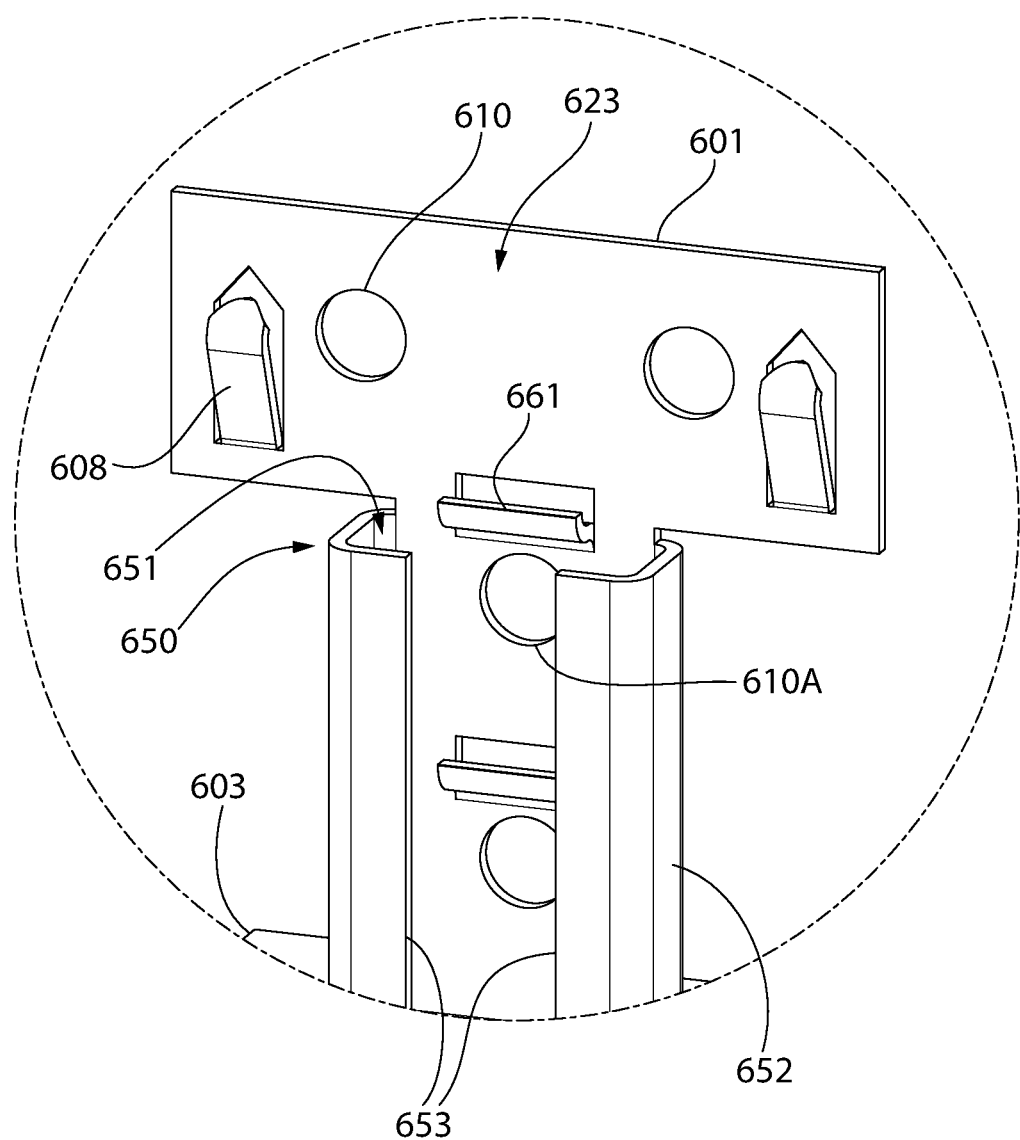
FIG. 25 is an enlarged detail taken from FIG. 22.

A second index feature of adjustment strap 630 is formed by a plurality of vertically spaced apart cantilevered L-shaped index tabs 660 that project rearwardly from rear side 634 of the adjustment strap 630. Index tabs 660 engage corresponding cantilevered L-shaped index tabs 661 that project forwardly from side flange 601 of mounting bracket 602. Index tabs 660 and 661 form hook structures in configuration. As best shown in FIG. 23, index tabs 660 extend outwardly and downwardly while index tabs 661 extend outwardly and upwardly, thereby allowing the curved free ends of the tabs to be received in the recesses formed beneath each tab. This creates the interlocked tab arrangement illustrated. In other embodiments, the orientation of tabs 660 and 661 may of course be reversed to achieve the same result and meshed arrangement. In one embodiment, two index tabs 661 may be provided as depicted with one tab 661 each located above and below fixation hole 610A in the mounting bracket 602. Fixation hole 610A and at least one mounting bracket index tab 661 may be positioned inside channel 651 in one embodiment. Index tabs 660 may be spaced uniformly apart by equal distances therebetween. The index tabs 660 define discrete incremental mounting positions.

A method of using grid hanger 600 is now described. In use after the mounting bracket 602 is attached to the support joist 230 via fasteners (e.g. nails, screws, etc.) and securement tabs 608, an installer or user slides the adjustment strap 630 of hanger member 604 up or down to the desired vertical position or height. When the hanger member 604 reaches the desired mounting height, the installer mutually engages the index tabs 660, 661 (best shown in FIG. 23). At least one index tab 660 is engages with at least one index tab 661. This automatically concentrically aligns fixation hole 610A with one of the index holes 640 formed in the adjustment strap 630 via predetermined vertical spacing of the index holes and index tabs 660, 661. A movable securement member configured and operable to lock hanger member 604 in one of the plurality of selectable indexed vertical mounting positions is provided. In one embodiment, the securement member may be a locking fastener 618 such as a screw or nail which may then be driven through the fixation hole 610A and mating index hole 640 into the support joist 230 to lock the hanger member 604 in vertical position. It bears noting that the index tabs 660, 661 help temporarily maintain the desired position of the hanger member 604 until the locking fastener 618 can be driven into the joist.

It bears noting that in this embodiment, the vertical axis VA of the hanger member 604 is parallel to and offset just slightly forward from the vertical mounting centerline CL of the mounting bracket 602 by the thickness of the upper adjustment strap 430. The centerline CL and vertical axis VA however lie in the same vertical plane midway between the peripheral edges 611 of the mounting bracket, and thus are in lateral alignment.

Figure 26:
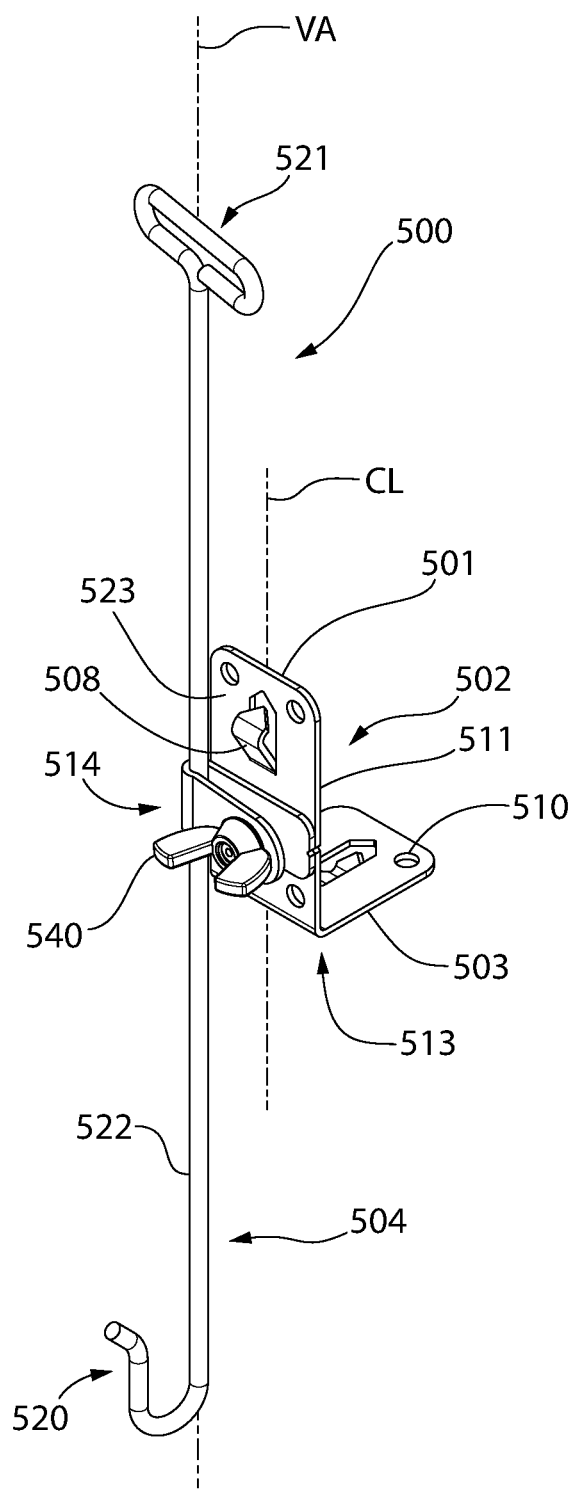
FIGS. 26 and 27 are front and rear perspective views respectively of a fourth embodiment of a grid hanger according to the present disclosure.
Figure 27:
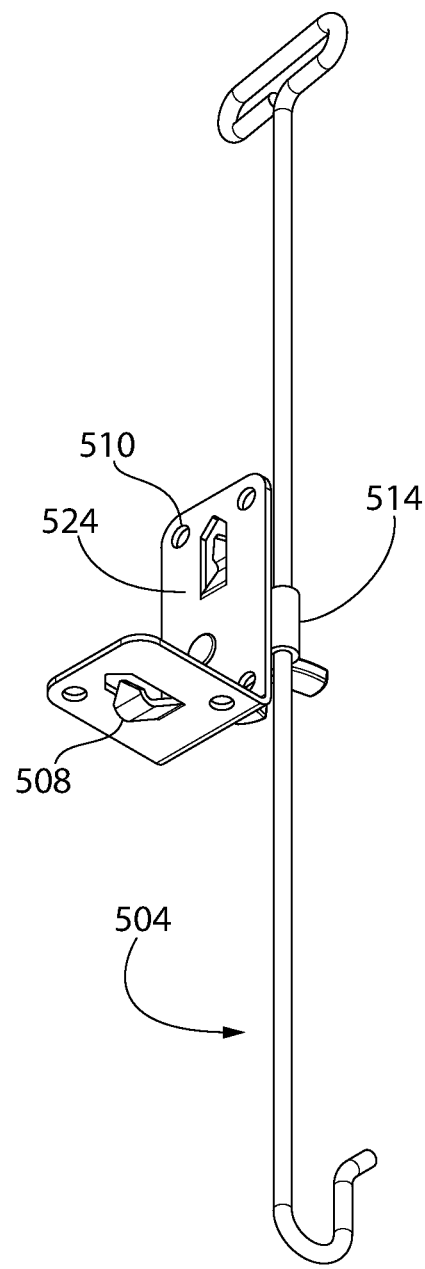
Figure 28:
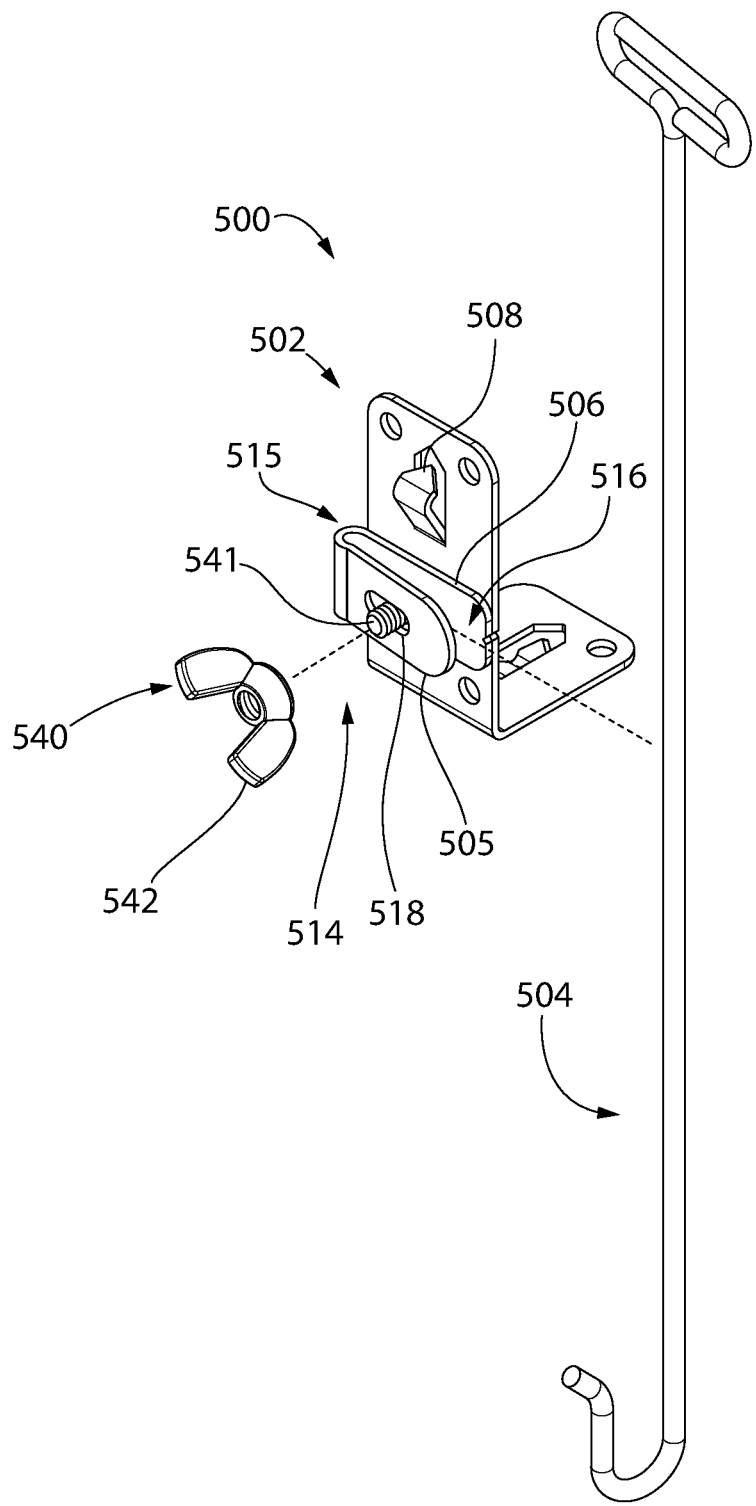
FIG. 28 is an exploded perspective view thereof.

FIGS. 26-28 disclose another embodiment of a grid hanger 500 for mounting the ceiling support grid to the joists 230. Grid hanger 500 contains elements similar to grid hanger 300 including an L-shaped mounting bracket 502 configured for attachment to overhead support joist 230 and a hanger member 504 slideably coupled thereto for coupling to a longitudinal grid support member 202. Mounting bracket 502 includes mounting portion 513 comprising an angled body including a horizontal bottom flange 503 and adjoining vertical side flange 501 extending upwards from the bottom flange. Mounting portion 513 defines a front side 523, rear side 524, and peripheral side edges 511 therebetween. The vertical side flange 501 may have a width coextensive with the width of bottom flange 503. In this embodiment, both side flange 501 and bottom flange 503 each includes at least one resiliently flexible cantilevered securement tabs 508 configured similarly to tab 308 already described herein. Securement tabs 508 are movable relative to the body of the mounting portion 513 of mounting bracket 502. Tabs 508 are operable to engage and at least temporarily hold mounting bracket 502 to a joist 230 in a similar manner to mounting bracket 302. A plurality of mounting apertures 510 such as round holes are provided in the bottom and side flanges 503, 501 that are configured to receive a fastener. The fastener, which may be a screw or nail, can then be installed through the mounting apertures 510 formed in the bracket mounting portion 513 to more permanently affix the mounting bracket 502 to the joist 230.

Mounting bracket 502 further includes a resiliently deformable spring clip 514 having an elastic memory attached to as a separated piece or formed integrally as a unitary structural part of the mounting bracket 502. Spring clip 514 may be disposed on the front side 523 of the mounting bracket 502. Spring clip 514 includes two elongated and horizontally spaced apart spring arms 505, 506 that extend perpendicularly to mounting centerline CL of the bracket 502. The arms 505, 506 are configured to form a generally V-shaped structure including a closed end 515 and opposite open end 516. Arm 506 is a stationary element fixedly disposed on the mounting portion 513 of mounting bracket 502 and arm 505 is a movable element that is deflectable relative to the fixed arm 506.

Hanger member 504 may be configured similarly to the rod-like hanger member 304 already described herein. Hanger member 504 includes a bottom coupling end 520 that may be configured as a J-hook in one embodiment for insertion through one of the mounting holes 222 formed in grid support member 202. An intermediate portion 522 of hanger member 504 is slideably received between arms 505 and 506 of spring clip 514. In one embodiment, the intermediate portion 522 passes through and engages the closed end 515 of the spring clip 514. The vertical axis VA of the hanger member 504 is laterally offset and parallel to the mounting centerline CL of the mounting bracket 502. In one embodiment, hanger member includes a curved top end 521 that forms a vertical travel stop restricting a range of vertical motion and position of the hanger member relative to the mounting bracket 502. This limits the lowest-most height of the hanger member 504 relative to the mounting bracket 502 and joist 230. Top end 521 may be bent to extend horizontally to engage the top edges of spring arms 505, 506. Top end 521 may be T-shaped in one embodiment. If moved downwards to its fullest extent, the curved top end 521 engages the top spring arm 305 at the guide hole 307.

The spring clip 514 is configured and operable to frictionally engage and secure the hanger member 504 in one of the plurality of selectable vertical mounting positions. Spring clip 514 is movable between a partially closed unlocked position allowing adjustment of the hanger member 504 relative to the mounting bracket, and a fully open locked position frictionally locking the hanger member in one of the selectable mounting positions via application of compressive clamping forces on the hanger member. In the locked position, the spring arms 5-5, 506 are spaced closest to each other. Spring clip 514 is resilient biased apart towards the fully open unlocked position.

A locking element 540 such as a threaded fastener includes a threaded shank or stud 541 that extends completely through a hole 518 in spring arm 505 and engages the mounting portion 513 (side flange 501) of mounting bracket 502 at a fixed end. Hole 518 may be a horizontal slot in one embodiment, as shown. The fixed end of the stud 541 may be preferably welded or threadably engaged with the side flange 501 of bracket 502. A threaded nut such as a wing nut 542 threadably engages the free end of the threaded stud 541. The wing nut 542 engages the front surface of spring arm 505 of the spring clip 514 when the nut is tightened to lock the hanger member 504 in vertical position via frictional engagement. In other embodiments, the locking element 540 may be configured as wing-head thumb screw with attached threaded shank which threadably engages the side flange 501. Other types of threaded fasteners, however, may be used.

Spring clip 514 is operable to frictionally engage and disengage the hanger member 504. In use after the mounting bracket 502 is attached to the support joist 230 via fasteners (e.g. nails, screws, etc.) and securement tabs 508, an installer or user rotates and loosens the threaded locking element 540 to allow the spring arms 505, 506 to expand to the unlocked position. This reduces the frictional force or hold between the hanger member 504 and spring clip 514, thereby allowing the installer to slide the hanger member more easily to the desired vertical position or height. The installer then tightens the locking element 540, which increases the frictional force between the spring clip 514 and hanger member 504 to lock the hanger member in the selected vertical position.

FIGS. 29-33 disclose another embodiment of a grid hanger 700 for mounting the ceiling support grid to the support joists 230, which is both vertically and angularly adjustable in position to better avoid existing fixtures such as piping, electrical wiring, structural beams, etc. Grid hanger 700 contains elements similar to grid hanger 300 including an L-shaped mounting bracket 702 configured for attachment to overhead support joist 230 and a hanger member 704 slideably coupled thereto for coupling to a longitudinal grid support member 202. Mounting bracket 702 includes mounting portion 713 comprising an angled body including a horizontal bottom flange 703 and adjoining vertical side flange 701 extending upwards from the bottom flange. Mounting portion 713 defines a front side 723, rear side 724, and peripheral side edges 711 therebetween. The vertical side flange 701 may have a width coextensive with the width of bottom flange 703. In this embodiment, both side flange 701 and bottom flange 703 each includes at least one resiliently flexible cantilevered securement tabs 708 configured similarly to tab 308 already described herein. Securement tabs 708 are movable relative to the body of the mounting portion 713 of mounting bracket 502. Tabs 708 are operable to engage and at least temporarily hold mounting bracket 702 to a joist 230 in a similar manner to mounting bracket 302. A plurality of mounting apertures 710 such as round holes are provided in the bottom and side flanges 703, 701 that are configured to receive a fastener. The fastener, which may be a screw or nail, can then be installed through the mounting apertures 710 formed in the bracket mounting portion 713 to more permanently affix the mounting bracket 702 to the joist 230.

Hanger member 704 includes a vertically elongated and laterally broadened adjustment strap 730. Adjustment strap 730 has generally flat body including parallel front and rear sides 433, 434 as shown. The adjustment strap 730 further includes a vertical linear adjustment slot 731. The top and bottom ends of the slot 731 are closed. The closed top end of the slot 731 forms a vertical travel stop restricting the range of vertical motion and position of the hanger member relative to the mounting bracket 502. This limits the lowest-most height of the hanger member 704 relative to the mounting bracket 702 and joist 230.

Adjustment slot 731 of adjustment strap 730 slideably receives a first locking element 740 therethrough. The locking element 740 may be a threaded fastener including a threaded shank or stud 741 that extends completely through the adjustment slot 731 and engages the side flange 701 of mounting bracket 702 at a fixed end. The fixed end of the stud 741 may be preferably welded or threadably engaged with the side flange 701 of bracket 702. A threaded nut such as a wing nut 742 threadably engages the free end of the threaded stud 741. The first locking element 740 both pivotably and linearly mounts the adjustment strap 730 to the mounting bracket 702. Accordingly, the adjustment strap 730 is both vertically and angularly adjustable via the first locking element 740. The wing nut 742 engages the front surface of adjustment strap 730 when the nut is tightened to lock the hanger member 504 in vertical position via frictional engagement. When the wing nut 742 is loosened, the strap 730 may be moved and adjusted both vertically and angularly in position and orientation. The first locking element 740 thus defines a pivot axis for strap 730.

In other embodiments, the locking element 540 may be configured as wing-head thumb screw with attached threaded shank which threadably engages the side flange 701. Other types of threaded fasteners, however, may be used.

Figure 31:
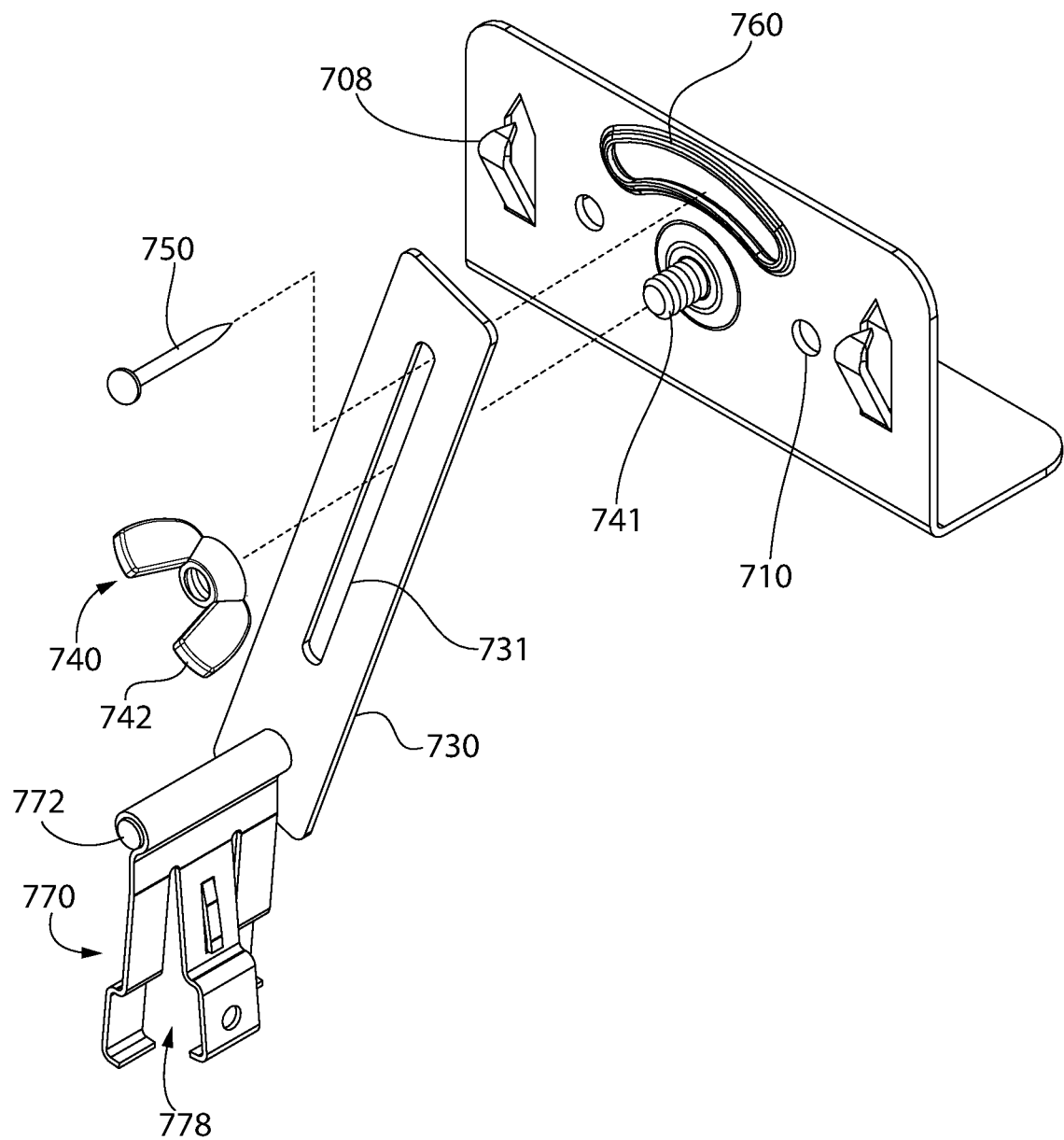
FIG. 31 is an exploded view thereof.
Figure 32:
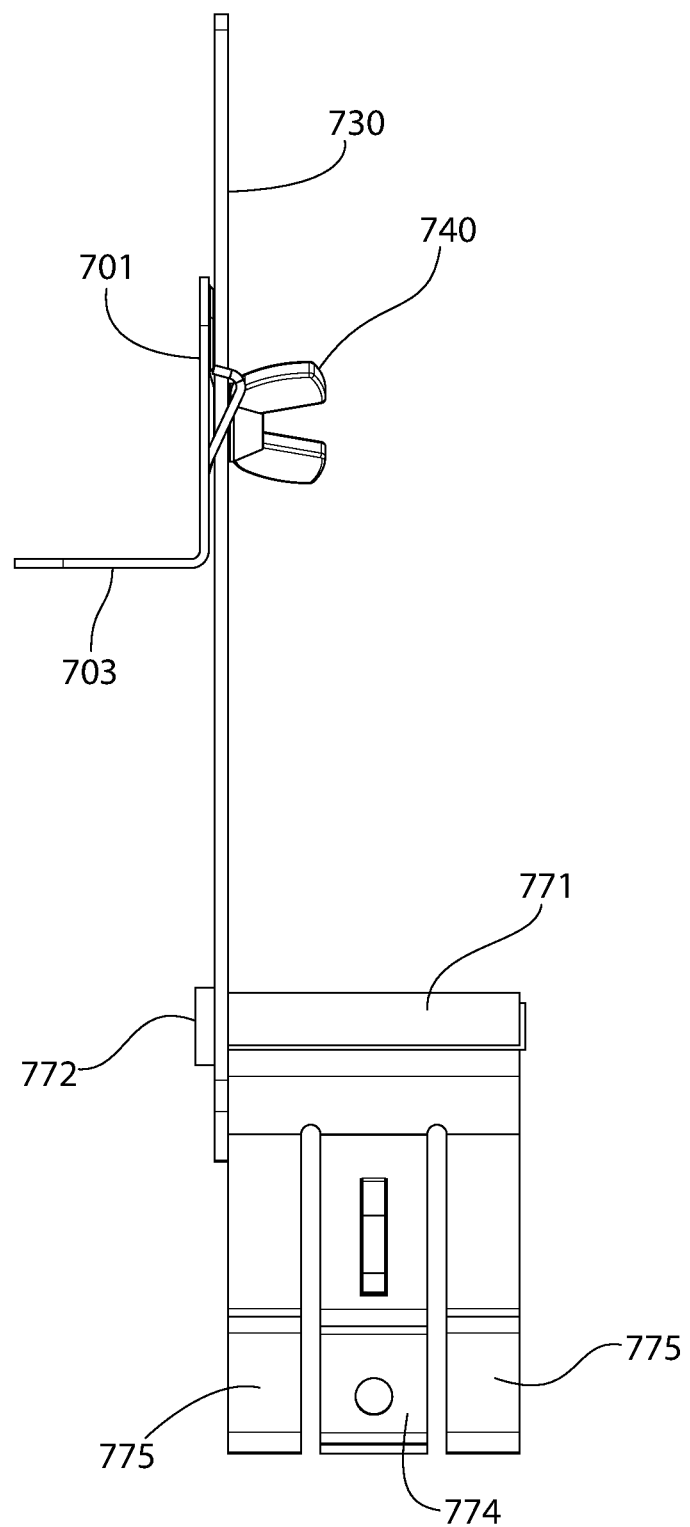
FIG. 32 is a side view thereof.
Figure 33:
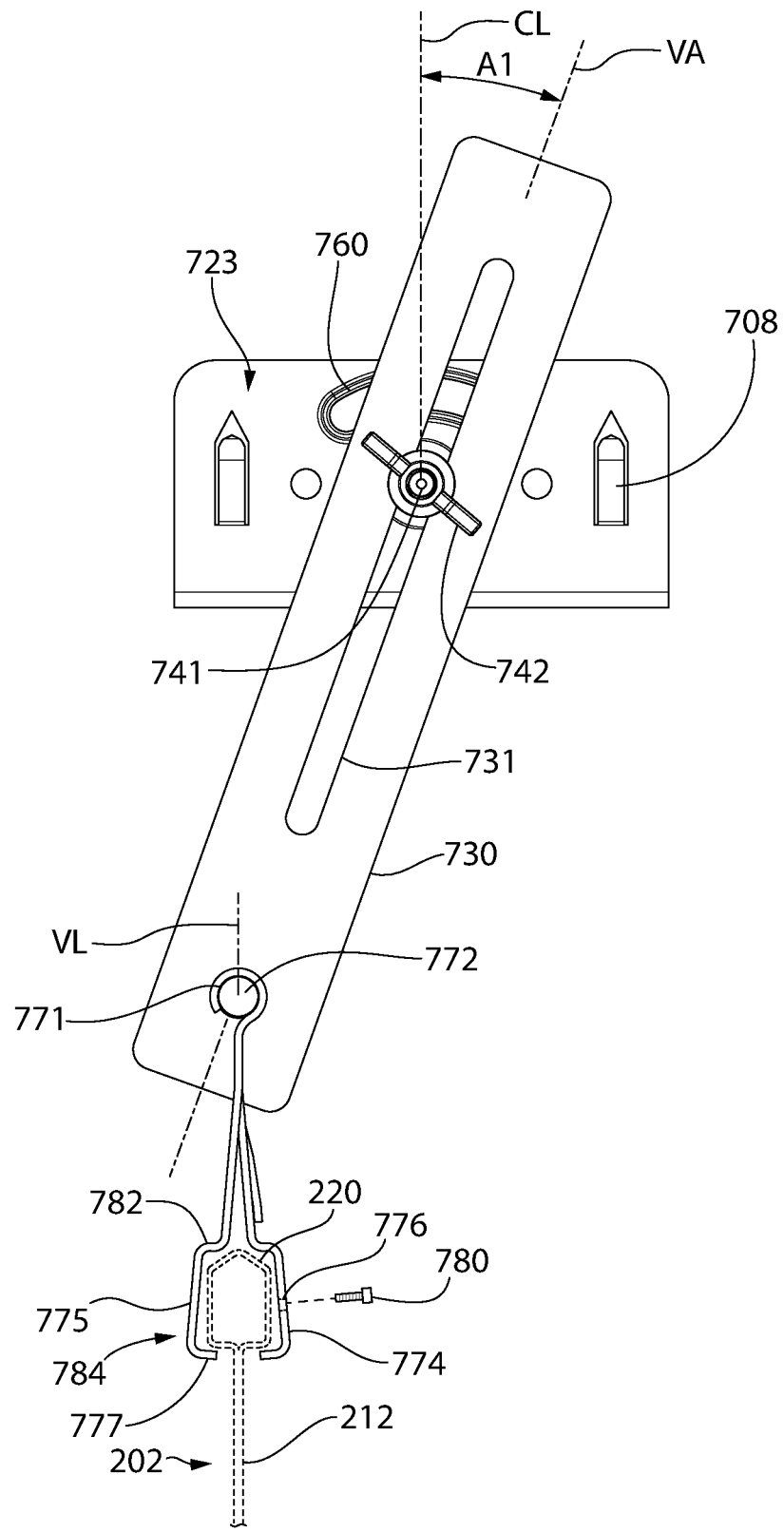
FIG. 33 is a front view thereof.
Figure 34:
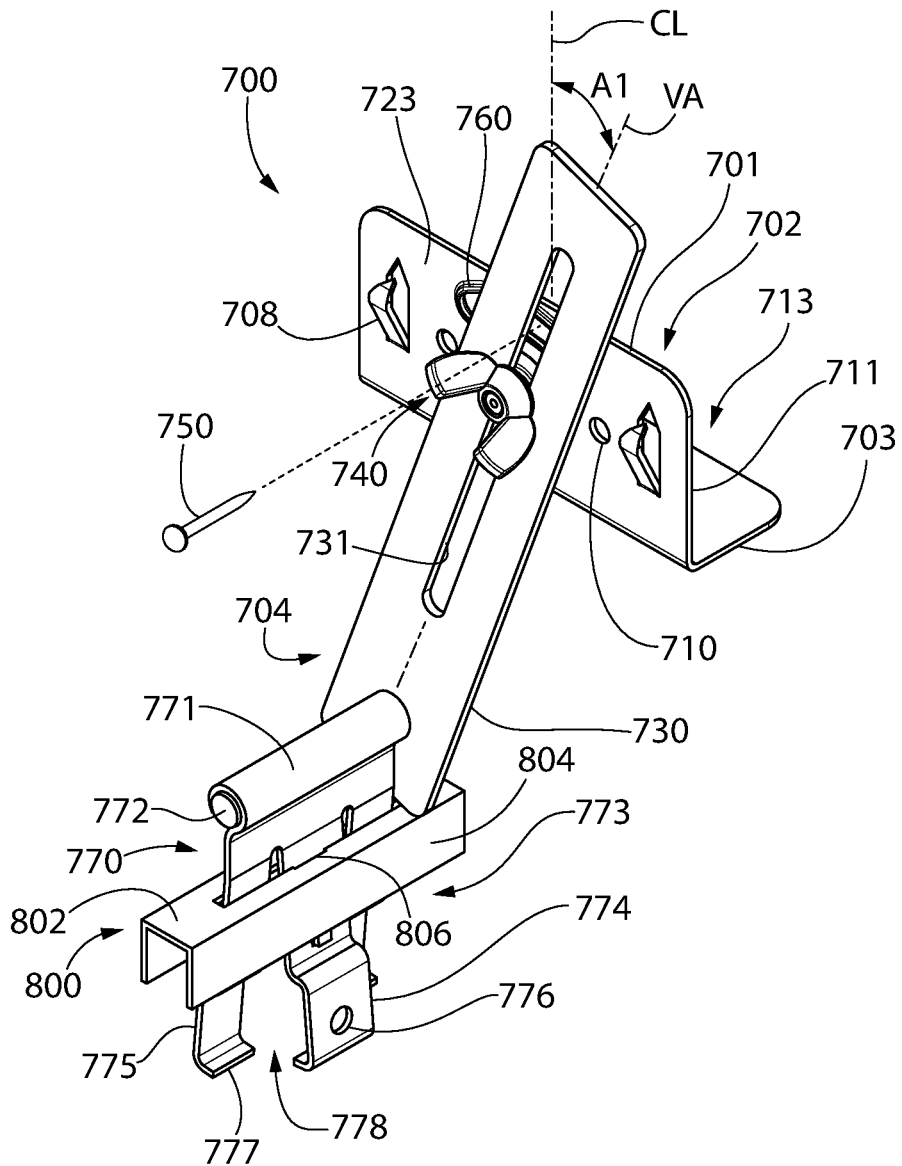
FIG. 34 is front perspective view of an alternative embodiment of the grid hanger of FIGS. 29 and 30 which includes a slideable locking collar.
Figure 35:
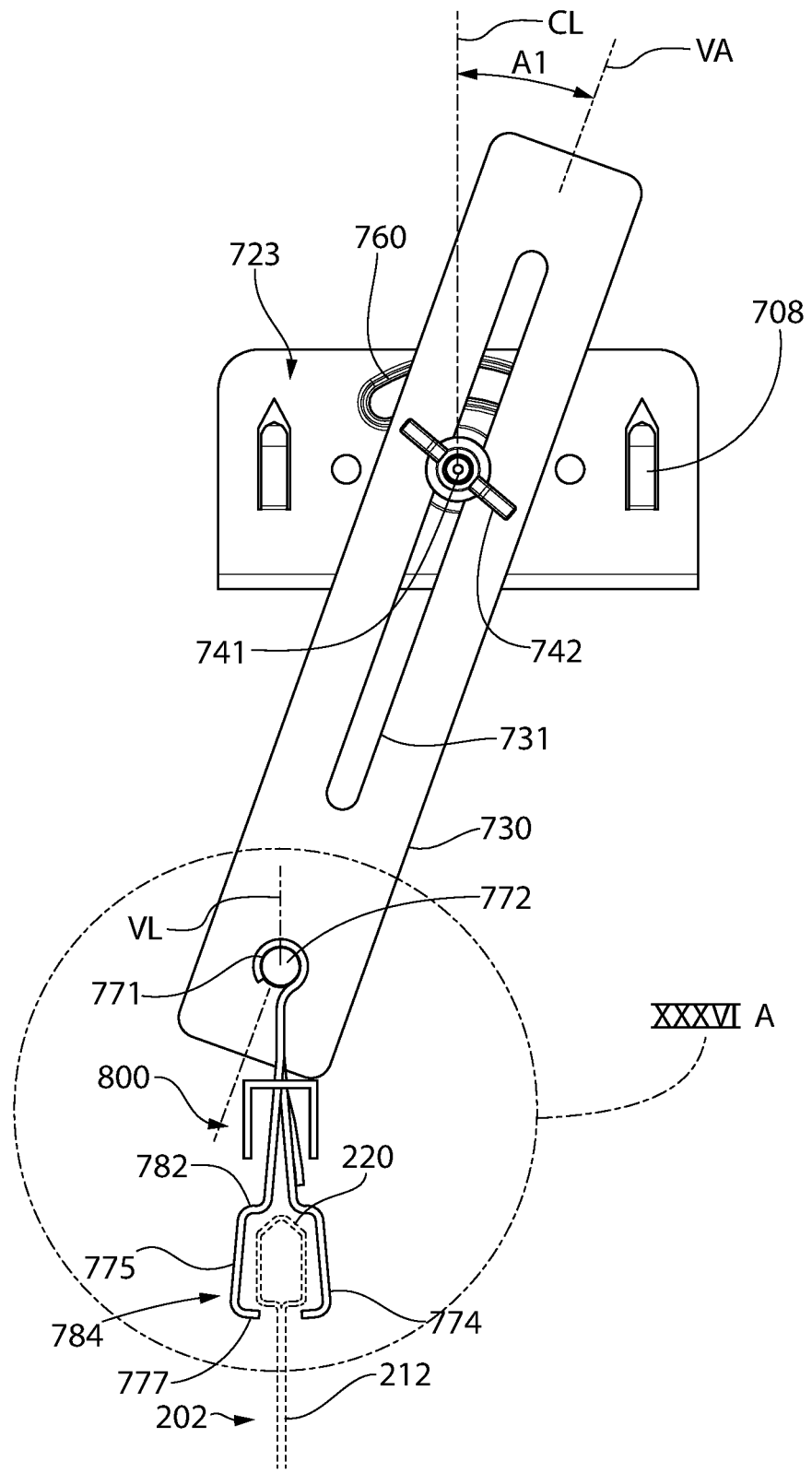
FIG. 35 is a front elevation view thereof.

Mounting bracket 702 further includes an arcuate slot 760 which is alignable in a plurality of angular positions with the linear slot 731 of the hanger member 702. Slot 760 may be disposed above and arches over the top of threaded stud 741 affixed to the side flange 701 of mounting bracket 702 as best shown in FIG. 31. For adjusting angular position or orientation of the adjustment strap 730, the strap may be rotated left or right about the first locking element 740 (i.e. threaded stud 741). Adjustment strap 730 defines a vertical axis VA extending along its length such that the strap is adjustable between a plurality of angles A1 to the vertical mounting centerline CL of the mounting bracket 702. In some embodiments, the strap 730 is adjustable from angles A1 of about −180 degrees to about +180 degrees including any angles therebetween. Where angular adjustment is not needed or desired, angle A1 may be zero (i.e. vertical axis VA is parallel to mounting centerline CL).

The arcuate slot 760 and a portion of linear adjustment slot 731 in strap 730 will intersect and overlap for the angular length of travel provided by the arcuate slot. When a desired angular orientation and height of the adjustment strap 730 of hanger member 704 is reached, a second locking element 750 such as a nail or screw may be driven through both the superimposed arcuate and linear slots 760, 731 to lock the hanger member in one of a plurality of both vertical and angular positions relative to the mounting bracket 702. Advantageously, the ability to both vertically and angularly adjust the hanger member 704 allows the installer or user to avoid existing installation obstacles such as wiring, lighting fixtures, pipes, etc. when hanging the longitudinal grid support members 202 from the support joists 230.

With continuing reference to FIGS. 29-33, hanger member 704 further includes a coupling member configured to engage a longitudinal grid support member 202 of the ceiling system. In one embodiment, the coupling member may be a clamp 770 including a plurality of elongated and resiliently flexible locking jaws 774, 775 configured to engage the bulbous top stiffening channel 220 of the grid support member 202 (reference FIG. 6). The locking jaws may be formed on a lower portion of the clamp. Clamp 770 may be pivotably connected to a lower portion of the hanger member adjustment strap 730 via a pivot pin 772. Advantageously, this ensures that the clamp 770 will maintain a vertical orientation to engage the grid support member 202 regardless of the angular position of the hanger member adjustment strap 730. Pivot pin 772 has a fixed end securely coupled to adjustment strap 730 and extends forwardly from a front surface of the strap as shown. Clamp 770 includes a rolled cylindrical knuckle or barrel 771 at top of an upper portion the clamp which is configured to receive pivot pin 772 therethrough as shown for pivotably mounting the clamp to the adjustment strap 730. The locking jaws 774, 775 extend downwardly from the barrel 771. The locking jaws preferably include at least one right jaw 774 and at least one opposing left jaw 775 (left and right sides defined by looking toward front side 723 of mounting bracket 702). In the illustrated embodiment, there are two left jaws 775 spaced apart and a single right jaw 774 positioned in the gap between the left jaws. The left and right jaws are oriented at a slight oblique angle to each other and a vertical reference line VL drawn through the pivot pin 772. The bottom ends of the locking jaws 774, 775 are inwardly curved towards reference line VL to define hooks or ledges 777 which are configured to engage the underside of grid support member top stiffening channel 220 when mounted in the clamp 771. Each locking jaw 774, 775 further includes a shoulder 782 spaced vertical apart from its respective ledge 777 which generally conforms to the cross-sectional shape of the stiffening channel 220. This creates a laterally "bumped out" and widened lower section of each jaw defining a lateral engagement sidewalls 784 of each jaw which lies in a different vertical plane than the upper section of each jaw that adjoins the barrel 771. The jaws 774, 775 including shoulders 782 are configured to collectively define a central void 778 having a generally complementary configuration to the cross-sectional shape of the grid support member top stiffening channel 220 when the jaws are in an undeflected position shown in the figures.

Clamp 770 including locking jaws 774, 775 may be formed as a monolithic unitary structure in some embodiments. The clamp 770 and locking jaws 774, 775 may be formed of sheet metal having a suitable thickness and a resilient elastic memory to act as spring members. In one embodiment, spring steel may be used; however, other suitable metals having an elastic memory may be used. The clamp 770 including locking jaws 774, 775 are resiliently movable together and apart between the normal undeflected position when disengaged from the grid support member 202 and a deflected position either partially or fully engaged with the grid support member.

A method of using grid hanger 700 is now described. In use after the mounting bracket 702 is attached to the support joist 230 via fasteners (e.g. nails, screws, etc.) and securement tabs 708, an installer or user rotates and loosens the threaded first locking element 740. This reduces the frictional force or hold between the hanger member 704 and mounting bracket 702, thereby allowing the installer to slide the adjustment strap 730 upward and downward to the desired vertical position or height, and simultaneously also angularly left or right to the desired angular orientation or position about threaded stud 741. The installer then tightens the locking element 740, which increases the frictional force between the wing nut 742 and adjustment strap 730 to lock the hanger member in the selected vertical and angular positions. To help more permanently maintain the selected angular position of strap 730, the second locking element 750 may be driven through superimposed linear slot 731 and arcuate slot 760 into the support joist 230, thereby locking the angular position.

The clamp 770 may be coupled to the longitudinal grid support member 202 by pressing or forcing the locking jaws 774, 775 downwards into engagement with the bulbous top stiffening channel 220 of grid support member 202. This deflects and spreads the locking jaws apart allowing the stiffening channel 220 to enter the central void 778 of the clamp 770 between the opposing jaws. The clamp 770 is in a deflected position as the jaws 774, 775 slide downwards along the sides of the stiffening channel Once the inwardly curved bottom end ledges 777 of the locking jaws 774, 775 pass below the stiffening channel 770 of the grid support member, the elastic memory of the inwardly-biased jaws will cause the jaws to snap inwards beneath and engage the underside of the top stiffening channel 220. The lateral portions of the jaws 774, 775 may also frictionally engage the sides of the stiffening channel 220. The ledges 777 prevent withdrawal of the stiffening channel 220 from the clamp 770 without manually forcing the jaws of the clamp apart. The clamp is now back in the starting undeflected position, or a partially deflected position if the jaws 774, 775 do not fully close which increases frictional securement of the grid support member 202 to the clamp 770. A threaded fastener such as a screw 780 may optionally be threaded through a locking hole 776 in one of the jaws 774 or 775 to engage the stiffening channel 220 and help secure the clamp 770 on the grid support member 202.

FIGS. 34-36B shown an alternative embodiment of the clamp 770 assembly which includes a locking collar 800 which may be used to deform and secure the clamp to the grid support member 202 in lieu of or in addition to screw 780. Locking collar 800 includes a horizontally elongated top wall 802 and pair of opposing sidewalls 804 extending downwards from and perpendicular to the top wall. The top wall and sidewalls may be substantially flat or planar in one embodiment. Sidewalls 804 are spaced laterally apart and configured to receive the resilient locking jaws 774, 775 therebetween in use, as further described herein. The sidewalls 804 are preferably spaced apart by a shorter lateral distance than the locking jaws 774, 775. This enables the collar 800 to deflect and compress the jaws inwards when the collar engages the jaws.

Figure 37:
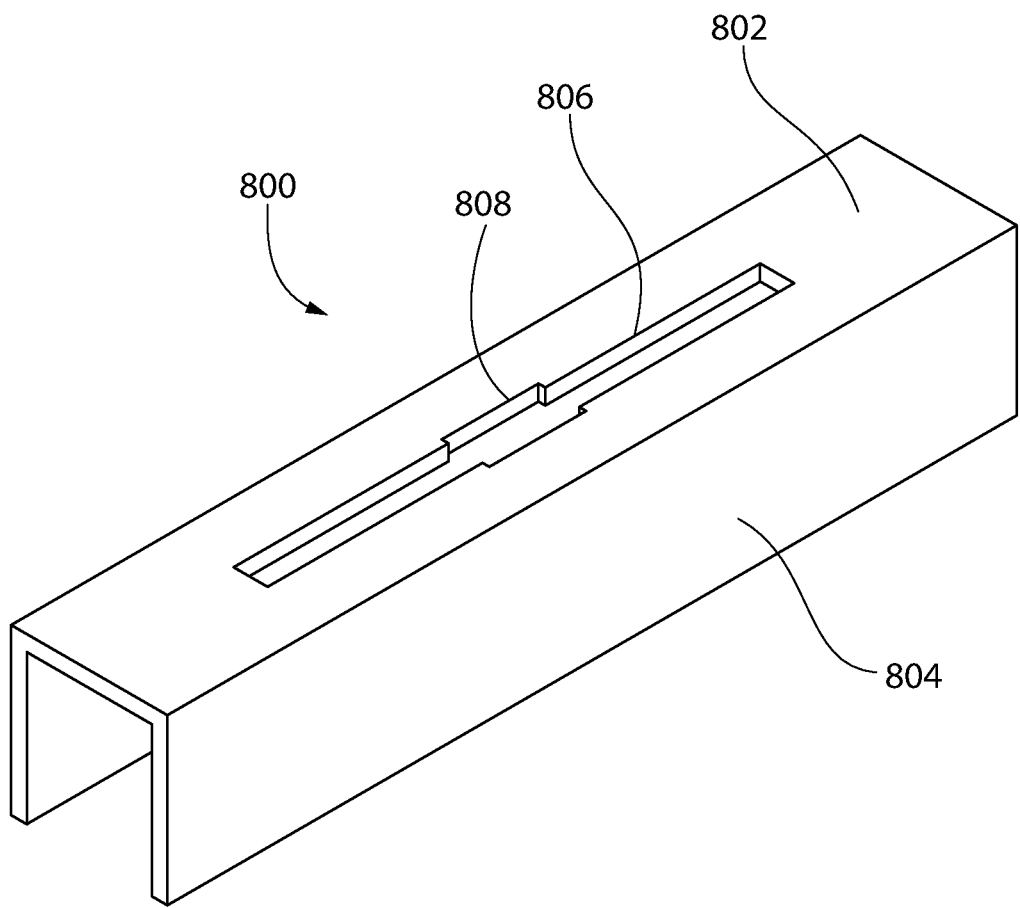
FIG. 37 is a perspective view of a first embodiment of the locking collar.
Figure 38:
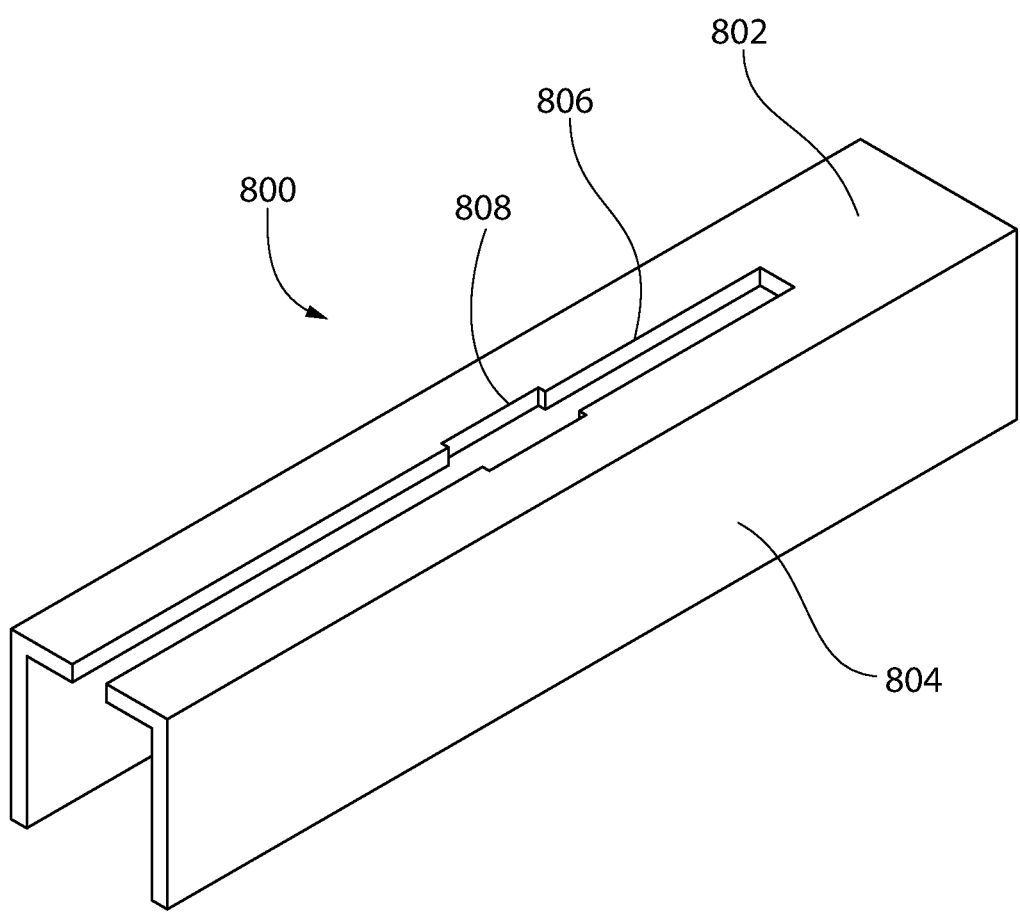
FIG. 38 is a perspective view of a second embodiment of the locking collar.

The top wall 802 includes an elongated slit 806 which receives the upper portion of clamp 770 and locking jaws 774, 775 therethrough. In one embodiment, slit 806 may penetrate one end of the top wall 802 (see, e.g. FIG. 37). In another embodiment, the slit 806 may be captive and positioned between the ends of the top wall (see, e.g. FIG. 38). In either embodiment, slit 806 may include an enlarged rectilinear central opening 808 through which the upper portion of jaws 774, 775 are received as shown in FIGS. 34-36B.

Figure 36A:
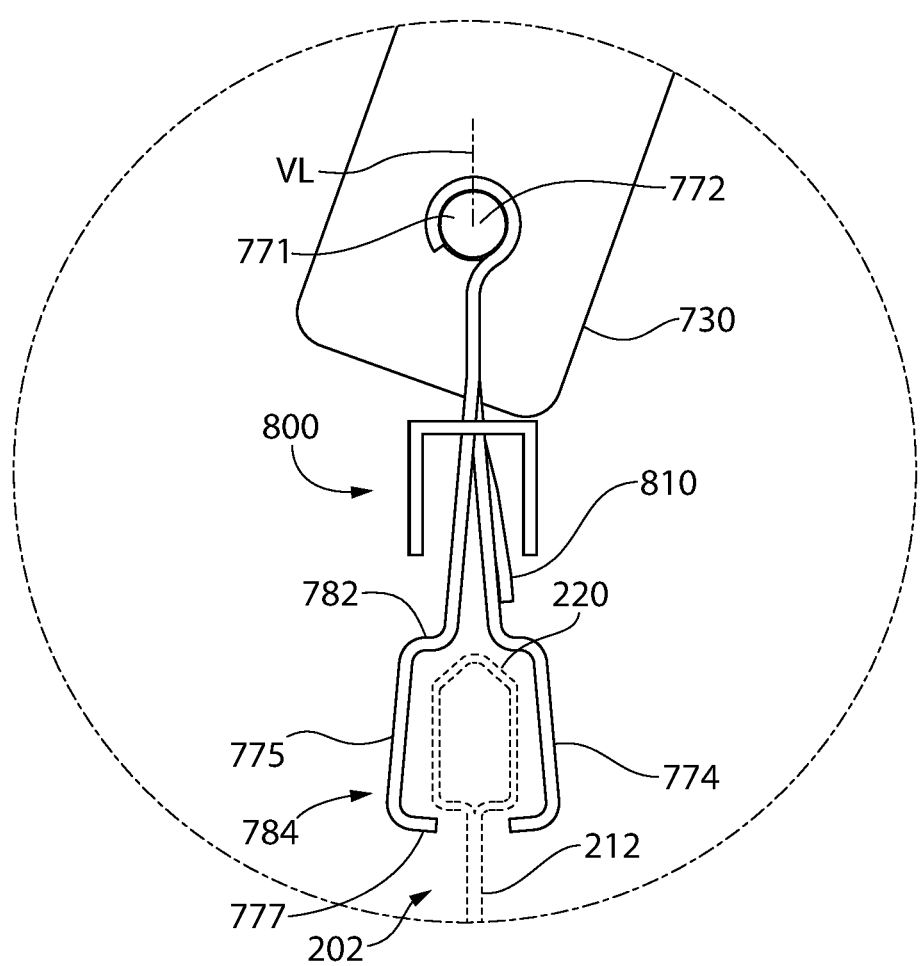
FIG. 36A is an enlarged view showing the locking collar in a first unlocked position.
Figure 36B:
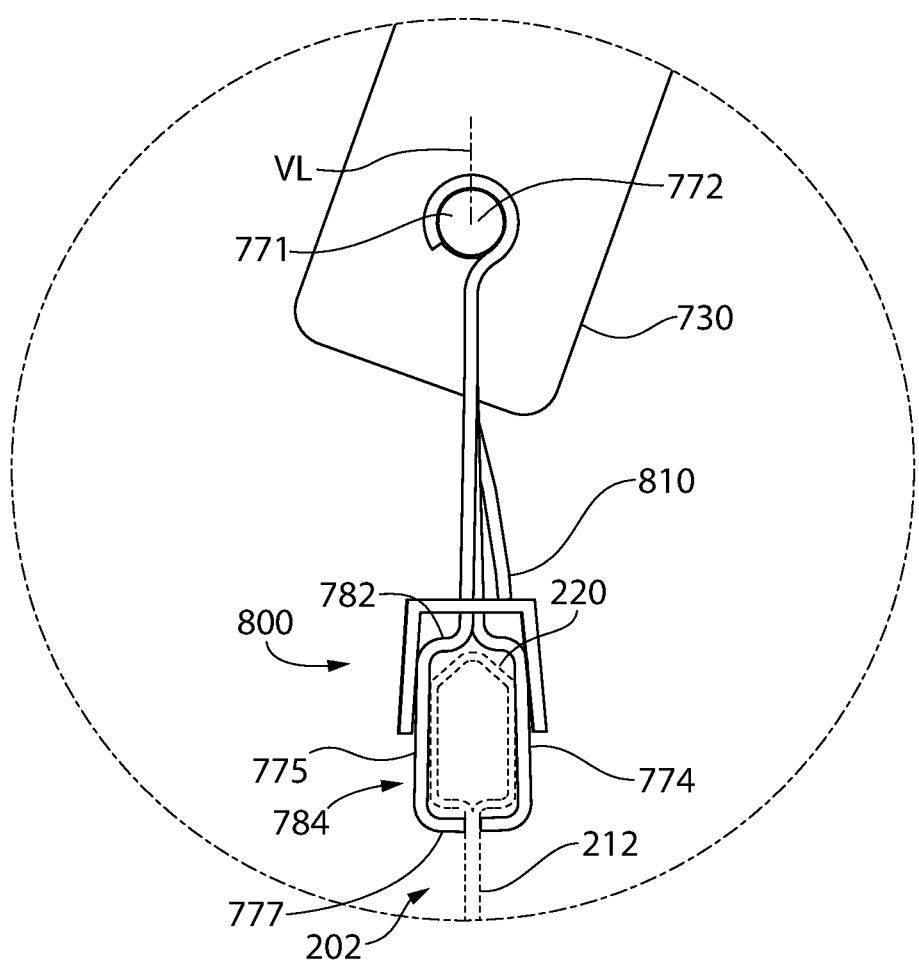
FIG. 36B is an enlarged view showing the locking collar in a second locked position.

Locking collar 800 is vertically and linearly slideable on the clamp 770 between an upper position located at least partially above the central void 778 and widened lateral engagement sidewalls 784 of the resiliently flexible locking jaws 774, 775 (see, e.g. FIG. 36A), and a lower locked position (see, e.g. FIG. 36B). In the lower locked position, the engagement sidewalls 784 of each jaw are received between the sidewalls 804 of the collar 800. In use once the installer inserts the top stiffening channel 220 of the grid support member 202 between the locking jaws 774, 775 as described above, the installer slides the collar 800 downward from the upper position over the engagement sidewalls 784 of the jaws. A resiliently movable locking tab 810 protruding laterally outwards from one of the locking jaws 774 or 775 is deflect inwards by the collar during this motion. The jaws 774, 775 then enter the collar 800 and are squeezed together by the collar 800 to securely clamp onto the grid support member top stiffening channel 220 as shown in FIG. 36B. Once the top wall 802 of the collar 800 passes below the resiliently movable locking tab 810, the tab spring back outwards to its undeflected position thereby locking the collar 800 in place. The collar 800 cannot be raised again without manually depressing the locking tab 810. Accordingly, the collar 800 locks the clamp 770 onto the grid support member.

In general, it will be appreciated that the sequential steps of any of the grid hanger and grid support installation methods disclosed herein may of course be altered and performed in any order by the installer depending on the installation requirements and/or preferences of the installer. For example, using grid hanger 700 as an illustration, the grid support member 202 may first be attached to the grid hanger 700 after the mounting bracket 702 is installed on the joist 230, and then the height and/or angular position of the hanger member 704 may be adjusted as required. Accordingly, numerous variations of the installation methods described herein are possible and may be used in other embodiments. The invention is therefore not limited to the sequence of installation steps enumerated herein.

The grid hangers disclosed herein including mounting brackets and hanger members may be constructed preferably of a suitable metal if not otherwise specifically enumerated herein.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A grid hanger assembly for mounting a ceiling system, the grid hanger assembly comprising:
    a mounting bracket comprising an elastically deformable spring clip, the mounting bracket defining a vertical mounting centerline;
    the mounting bracket comprising a bottom flange and adjoining vertical side flange extending upwardly from the bottom flange, the bottom and side flanges configured to engage an overhead support structure when mounted thereto;
    an elongated hanger member slideably coupled to the spring clip, the hanger member including a coupling end configured to engage a grid support member of the ceiling system and a top end having a travel stop that limits the height of the hanger member relative to the mounting bracket, the spring clip configured to frictionally secure the hanger member in one of a plurality of mounting positions relative to the mounting bracket; and
    wherein the spring clip is deformable between an unlocked position allowing adjustment of the hanger member relative to the mounting bracket and a locked position frictionally locking the hanger member.

2. The grid hanger assembly according to claim 1, wherein the spring clip comprises a pair of outwardly and laterally projecting resilient spring arms obliquely angled in relation to each other forming a generally V-shaped structure.

3. The grid hanger assembly according to claim 2, wherein the spring arms extend outwards from a front side of the side flange of the mounting bracket in a direction opposite to the bottom flange which extends perpendicularly from a rear side of the side flange.

4. The grid hanger assembly according to claim 2, wherein the arms are located midway between vertical peripheral side edges of the bracket.

5. The grid hanger assembly according to claim 2, wherein each spring arm comprises an intermediate portion joined to the side flange and a horizontal terminal end obliquely angled to the intermediate portion, the intermediate portion of each spring arm disposed obliquely angled to the side flange.

6. The grid hanger assembly according to claim 2, wherein the bottom and side flanges and the spring arms are formed as integral unitary structural parts of the mounting bracket body which are bent to form the flanges and spring arms.

7. The grid hanger assembly according to claim 1, wherein the mounting bracket is horizontally elongated having a greater width than height.

8. The grid hanger assembly according to claim 1, wherein the bottom flange is oriented perpendicularly to the side flange and bifurcated such that the bottom flange comprises a pair of laterally spaced apart first and second flange sections arranged to engage a bottom surface of the overhead support structure.

9. The grid hanger assembly according to claim 1, wherein the mounting bracket includes a pair of resiliently flexible cantilevered securement tabs movable relative to a body of the mounting bracket, each securement tab having a pointed end configured to engage the overhead support structure and wherein the overhead support structure is a joist.

10. The grid hanger assembly according to claim 1, wherein the hanger member is a J-shaped hook, and wherein the hanger member is slideable through a pair of spaced apart guide holes formed in the spring clip.

11. The grid hanger assembly according to claim 1, wherein the travel stop is an L-shaped curved end having a portion that projects laterally.

12. The grid hanger assembly according to claim 1, wherein the spring clip comprises a plurality of guide holes that are configured to slideably couple the elongated hanger member to the spring clip, the guide hole is defined by an edge comprising a first linear edge portion, a second linear edge portion, a third linear edge portion, and a fourth linear edge portion; wherein the first linear edge portion and second linear edge portion converge upwardly towards each other, and wherein the third linear edge portion and fourth linear edge portion converge downwardly towards each other.

13. A ceiling system comprising:
an overhead support structure;
a grid support member defining a longitudinal axis;
a ceiling panel supported by the grid support member;
a mounting bracket defining a vertical mounting centerline and comprising a bottom flange and adjoining side flange extending upwardly from the bottom flange, the flanges abuttingly engaging the overhead support structure;
the mounting bracket comprising an elastically deformably spring clip, the spring clip comprising a plurality of spring arms each having a guide hole;
an elongated hanger member slideably coupled to the spring clip through the guide holes, the spring clip configured and operable to frictionally secure the hanger member in a plurality of mounting positions relative to the mounting bracket, the elongated hanger member comprising a top end having a travel stop that limits the height of the hanger member relative to the mounting bracket;
wherein the guide holes are defined by an edge comprising a first linear edge portion, a second linear edge portion, a third linear edge portion, and a fourth linear edge portion;
wherein the first linear edge portion and second linear edge portion converge upwardly towards each other, and wherein the third linear edge portion and fourth linear edge portion converge downwardly towards each other; and
wherein the spring clip is deformable between an unlocked position allowing adjustment of the hanger member relative to the mounting bracket and a locked position frictionally locking the hanger member in one of the selectable mounting positions.

14. The ceiling system according to claim 13, wherein the spring arms project outwardly and laterally and the spring arms are obliquely angled in relation to each other forming a generally V-shaped structure.

15. The ceiling system according to claim 14, wherein the hanger member is a J-shaped hook slideably received through the guide holes in each of the spring arms.

16. The ceiling system according to claim 13, wherein the bottom flange is oriented perpendicularly to the side flange and engaged with a bottom surface of the overhead support structure and wherein the side flange is fixedly mounted to the overhead support structure.

17. The ceiling system according to claim 13, wherein the mounting bracket includes a pair of resiliently flexible cantilevered securement tabs movable relative to a body of the mounting bracket, each securement tab having a pointed end engaged with the overhead support structure.

18. The ceiling system according to claim 13, wherein the guide holes may be diamond shaped, polygonal, or non-polygonal.

19. A grid hanger assembly for mounting a ceiling system, the grid hanger assembly comprising:
a mounting bracket comprising an elastically deformable spring clip, the mounting bracket defining a vertical mounting centerline, the mounting bracket comprising a bottom flange and adjoining vertical side flange extending upwardly from the bottom flange, the bottom and side flanges configured to engage an overhead support structure when mounted thereto;
an elongated hanger member slideably coupled to the spring clip, the hanger member including a coupling end configured to engage a grid support member of the ceiling system and a top end having a travel stop that limits the height of the hanger member relative to the mounting bracket, the spring clip configured to frictionally secure the hanger member in one of a plurality of mounting positions relative to the mounting bracket;
wherein the spring clip is deformable between an unlocked position allowing adjustment of the hanger member relative to the mounting bracket and a locked position frictionally locking the hanger member; and
wherein the spring clip comprises a plurality of guide holes that are configured to slideably couple the elongated hanger member to the spring clip, the guide holes are defined by an edge comprising a first linear edge portion, a second linear edge portion, a third linear edge portion, and a fourth linear edge portion; wherein the first linear edge portion and second linear edge portion converge upwardly towards each other, and wherein the third linear edge portion and fourth linear edge portion converge downwardly towards each other.

* * * * *